United States Patent
An et al.

(10) Patent No.: US 11,238,832 B2
(45) Date of Patent: Feb. 1, 2022

(54) ELECTRONIC DEVICE AND METHOD FOR DRIVING DISPLAY OF ELECTRONIC DEVICE

(71) Applicant: SAMSUNG ELECTRONICS CO., LTD., Suwon-si (KR)

(72) Inventors: Jungchul An, Suwon-si (KR); Jongkon Bae, Suwon-si (KR); Sungho Lee, Suwon-si (KR); Hanchul Jung, Suwon-si (KR); Youngin Choi, Suwon-si (KR); Donghyun Yeom, Suwon-si (KR); Minwoo Yoo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/980,901

(22) PCT Filed: Mar. 19, 2019

(86) PCT No.: PCT/KR2019/003203
§ 371 (c)(1),
(2) Date: Sep. 15, 2020

(87) PCT Pub. No.: WO2019/182336
PCT Pub. Date: Sep. 26, 2019

(65) Prior Publication Data
US 2021/0012751 A1 Jan. 14, 2021

(30) Foreign Application Priority Data
Mar. 20, 2018 (KR) .................. 10-2018-0032162

(51) Int. Cl.
*G09G 5/14* (2006.01)

(52) U.S. Cl.
CPC ....... *G09G 5/14* (2013.01); *G09G 2320/0247* (2013.01); *G09G 2320/0673* (2013.01)

(58) Field of Classification Search
CPC ....... G09G 2320/0673; G09G 2380/02; G09G 2320/0247; G09G 2340/0421;
(Continued)

(56) References Cited

U.S. PATENT DOCUMENTS

| 6,819,304 B2 | 11/2004 | Branson |
| 9,098,241 B1 | 8/2015 | Cho et al. |

(Continued)

FOREIGN PATENT DOCUMENTS

| JP | 2005-156746 | 6/2005 |
| KR | 10-2000-0013534 | 3/2000 |

(Continued)

OTHER PUBLICATIONS

Extended Search Report dated Mar. 1, 2021 in counterpart European Patent Application No. 19770934.8.
(Continued)

*Primary Examiner* — Abbas I Abdulselam
(74) *Attorney, Agent, or Firm* — Nixon & Vanderhye, P.C.

(57) ABSTRACT

An electronic device, according to various embodiments of the present invention, comprises: a display comprising a first region exposed on the front surface of the electronic device and a second region accommodated within the electronic device or exposed to the exterior of the electronic device; at least one sensor for detecting a change in the display structure of the display; at least one display processor for controlling the driving of the display; and a main processor, wherein the main processor identifies a display area in which image data is to be displayed on the display, according to the change in the display structure of the display on the basis of
(Continued)

sensing information transmitted from the at least one sensor, determines a frame rate of the at least one display processor on the basis of the change in the display area, and drives the display at the determined frame rate.

15 Claims, 21 Drawing Sheets

(58) Field of Classification Search
CPC . G09G 3/035; G09G 5/00; G09G 5/14; G06F 1/1652; G06F 1/1624; G06F 1/1637
See application file for complete search history.

(56) References Cited

U.S. PATENT DOCUMENTS

| | | | |
|---|---|---|---|
| 9,508,306 B2 | 11/2016 | Kim et al. | |
| 9,865,203 B2 * | 1/2018 | Kim | G09G 3/2022 |
| 2007/0268200 A1 * | 11/2007 | Fuller | G06F 1/3265 |
| | | | 345/1.1 |
| 2009/0051830 A1 | 2/2009 | Matsushita et al. | |
| 2014/0204037 A1 | 7/2014 | Kim | |
| 2015/0172622 A1 | 6/2015 | Yoon et al. | |
| 2015/0339967 A1 | 11/2015 | Shin | |
| 2016/0307545 A1 | 10/2016 | Lee et al. | |
| 2017/0038641 A1 * | 2/2017 | Yamazaki | G02F 1/133308 |
| 2018/0032106 A1 | 2/2018 | Yu et al. | |

FOREIGN PATENT DOCUMENTS

| | | |
|---|---|---|
| KR | 10-2008-0018162 | 2/2008 |
| KR | 10-2014-0095347 | 8/2014 |
| KR | 10-2015-0069413 | 6/2015 |
| KR | 10-2015-0134167 | 12/2015 |
| KR | 10-2016-0011718 | 2/2016 |
| KR | 10-2016-0123201 | 10/2016 |
| KR | 10-2018-0014386 | 2/2018 |

OTHER PUBLICATIONS

Office Action dated Jan. 19, 2021 in counterpart Korean Patent Application No. 10-2018-0032162 and English-language translation.
Office Action dated Apr. 5, 2021 in counterpart Korean Patent Application No. 10-2018-0032162 and English-language translation.
International Search Report for PCT/KR2019/003203 dated Jun. 25, 2019, 5 pages.
Written Opinion of the ISA for PCT/KR2019/003203 dated Jun. 25, 2019, 5 pages.

* cited by examiner

ELECTRONIC DEVICE AND METHOD FOR DRIVING DISPLAY OF ELECTRONIC DEVICE

This application is the U.S. national phase of International Application No. PCT/KR2019/003203 filed Mar. 19, 2019 which designated the U.S. and claims priority to KR Patent Application No. 10-2018-0032162 filed Mar. 20, 2018, the entire contents of each of which are hereby incorporated by reference.

FIELD

Various embodiments of the disclosure relate to an electronic device and a method of driving a display of the electronic device.

DESCRIPTION OF RELATED ART

A display is a device provided in small and portable electronic devices, as well as large electronic devices, and an electronic device having a limited size, such as a portable electronic device, has a display that is also implemented to have a limited size. The development of communication and electronics technology has advanced displays in various forms according to the latest trends or user needs. For example, various techniques have been proposed to extend or fold the display or to improve the utilization of the display.

SUMMARY

In displaying a screen on a display in a recent electronic device such as a smartphone or a tablet PC, data is rendered such that the view region (or display region) on which a screen is to be displayed and the resolution of the display device are matched one to one, thereby displaying content on the view region of the display. However, in displaying a screen, if the resolution of the screen is changed, in order to change the driving of the display according to the defined resolution, it is required to stop the driving of the screen, change the resolution, and then drive the display. This causes the display of the electronic device to flicker due to interruption of driving of the screen, changing the resolution, and the like.

An electronic device according to various embodiments of the disclosure may display a screen without interrupting display of the screen when the view region of a display is changed.

An electronic device according to various embodiments may include: a display including a first region exposed on the front surface of the electronic device and a second region accommodated inside the electronic device or exposed to the outside of the electronic device; at least one sensor configured to detect a change in the structure of the display; at least one display processor configured to control driving of the display; and a main processor, wherein the main processor may be configured to, based on sensing information transmitted from the at least one sensor, identify a view region on which image data is to be displayed in the display according to the change in the structure of the display, determine a frame rate of the at least one display processor, based on a change in the view region, and drive the display at the determined frame rate.

A method of driving a display of an electronic device according to various embodiments may include: detecting a change in the structure of a display including a first region, which is always exposed on the front surface of the electronic device, and a second region, which is accommodated inside the electronic device or is exposed to the outside of the electronic device; identifying a view region on which image data is to be displayed in the display according to the change in the structure; determining a frame rate for driving the display in response to the identified view region; and driving the display at the determined frame rate.

Various embodiments of the disclosure may display information on a screen provided to a user without flickering when the view region is extended according to a change in the structure of the display.

An electronic device according to various embodiments may define the maximum resolution of a display so as to include a hidden region, and may change the frame rate of a driving circuit of the display depending on a change in the area of the view region on which image data is to be displayed, so it is not necessary to change the resolution when the display area of the display changes, thereby suppressing flickering of the screen, which occurs at the time at which the resolution changes.

DETAILED DESCRIPTION OF EXAMPLE EMBODIMENTS

Figure 1:
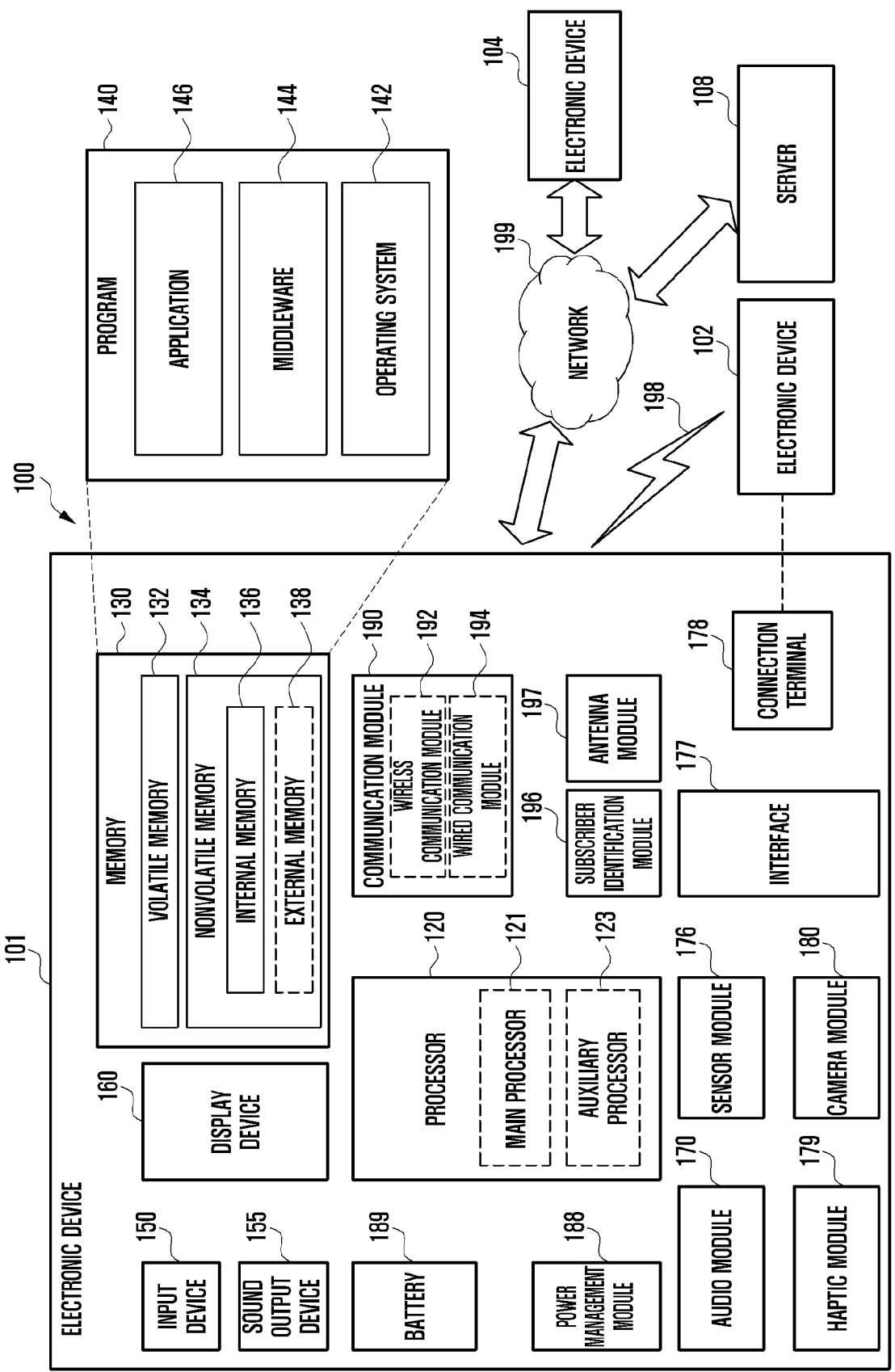
FIG. 1 is a block diagram illustrating an electronic device 101 in a network environment 100 according to various embodiments.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The display device 160 of the electronic device 101 according to various embodiments may be configured to have the display structure illustrated in FIGS. 3A to 3C and FIG. 4, and a detailed description of the display structure will be described below.

Figure 2:
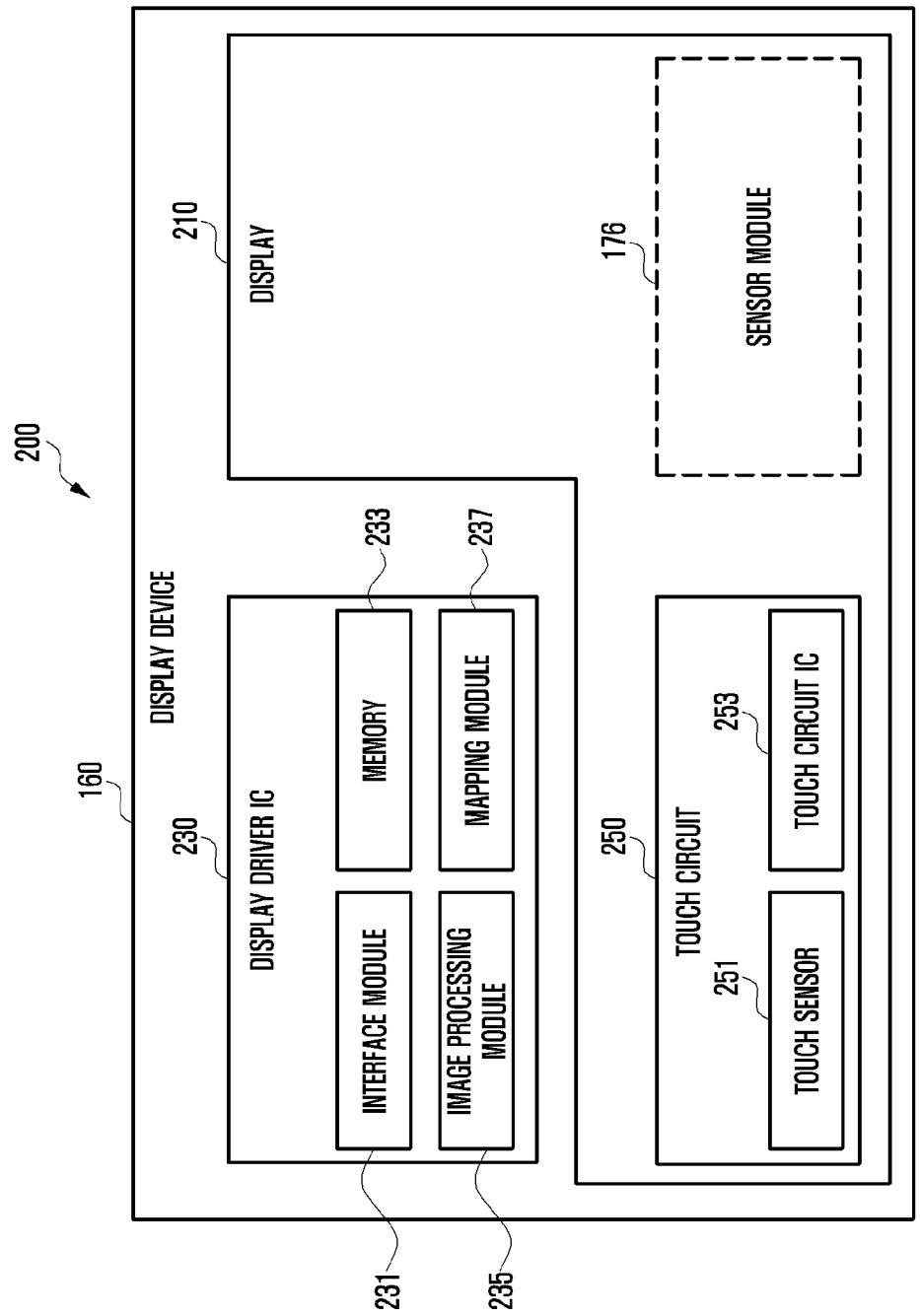
FIG. 2 is a block diagram illustrating the display device according to various embodiments.

FIG. 2 is a block diagram 200 illustrating the display device 160 according to various embodiments.

Referring to FIG. 2, the display device 160 may include a display 210 and a display driver integrated circuit (DDI) 230 to control the display 210. The DDI 230 may include an interface module 231, memory 233 (e.g., buffer memory), an image processing module 235, or a mapping module 237. The DDI 230 may receive image information that contains image data or an image control signal corresponding to a command to control the image data from another component of the electronic device 101 via the interface module 231. For example, according to an embodiment, the image information may be received from the processor 120 (e.g., the main processor 121 (e.g., an application processor)) or the auxiliary processor 123 (e.g., a graphics processing unit) operated independently from the function of the main processor 121. The DDI 230 may communicate, for example, with touch circuitry 150 or the sensor module 176 via the interface module 231. The DDI 230 may also store at least part of the received image information in the memory 233, for example, on a frame by frame basis. The image processing module 235 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 210. The mapping module 237 may generate a voltage value or a current value corresponding to the image data pre-processed or post-processed by the image processing module 235. According to an embodiment, the generating of the voltage value or current value may be performed, for example, based at least in part on one or more attributes of the pixels (e.g., an array, such as an RGB stripe or a pentile structure, of the pixels, or the size of each subpixel). At least some pixels of the display 210 may be driven, for example, based at least in part on the voltage value or the current value such that visual information (e.g., a text, an image, or an icon) corresponding to the image data may be displayed via the display 210.

According to an embodiment, the display device 160 may further include the touch circuitry 250. The touch circuitry 250 may include a touch sensor 251 and a touch sensor IC 253 to control the touch sensor 251. The touch sensor IC 253 may control the touch sensor 251 to sense a touch input or a hovering input with respect to a certain position on the display 210. To achieve this, for example, the touch sensor 251 may detect (e.g., measure) a change in a signal (e.g., a voltage, a quantity of light, a resistance, or a quantity of one or more electric charges) corresponding to the certain position on the display 210. The touch circuitry 250 may provide input information (e.g., a position, an area, a pressure, or a time) indicative of the touch input or the hovering input detected via the touch sensor 251 to the processor 120.

According to an embodiment, at least part (e.g., the touch sensor IC 253) of the touch circuitry 250 may be formed as part of the display 210 or the DDI 230, or as part of another component (e.g., the auxiliary processor 123) disposed outside the display device 160. According to an embodiment, the display device 160 may further include at least one sensor (e.g., a fingerprint sensor, an iris sensor, a pressure sensor, or an illuminance sensor) of the sensor module 176 or a control circuit for the at least one sensor. In such a case, the at least one sensor or the control circuit for the at least one sensor may be embedded in one portion of a component (e.g., the display 210, the DDI 230, or the touch circuitry 150)) of the display device 160. For example, when the sensor module 176 embedded in the display device 160 includes a biometric sensor (e.g., a fingerprint sensor), the biometric sensor may obtain biometric information (e.g., a fingerprint image) corresponding to a touch input received via a portion of the display 210. As another example, when the sensor module 176 embedded in the display device 160 includes a pressure sensor, the pressure sensor may obtain pressure information corresponding to a touch input received via a partial or whole area of the display 210. According to an embodiment, the touch sensor 251 or the sensor module 176 may be disposed between pixels in a pixel layer of the display 210, or over or under the pixel layer.

Figure 3A:
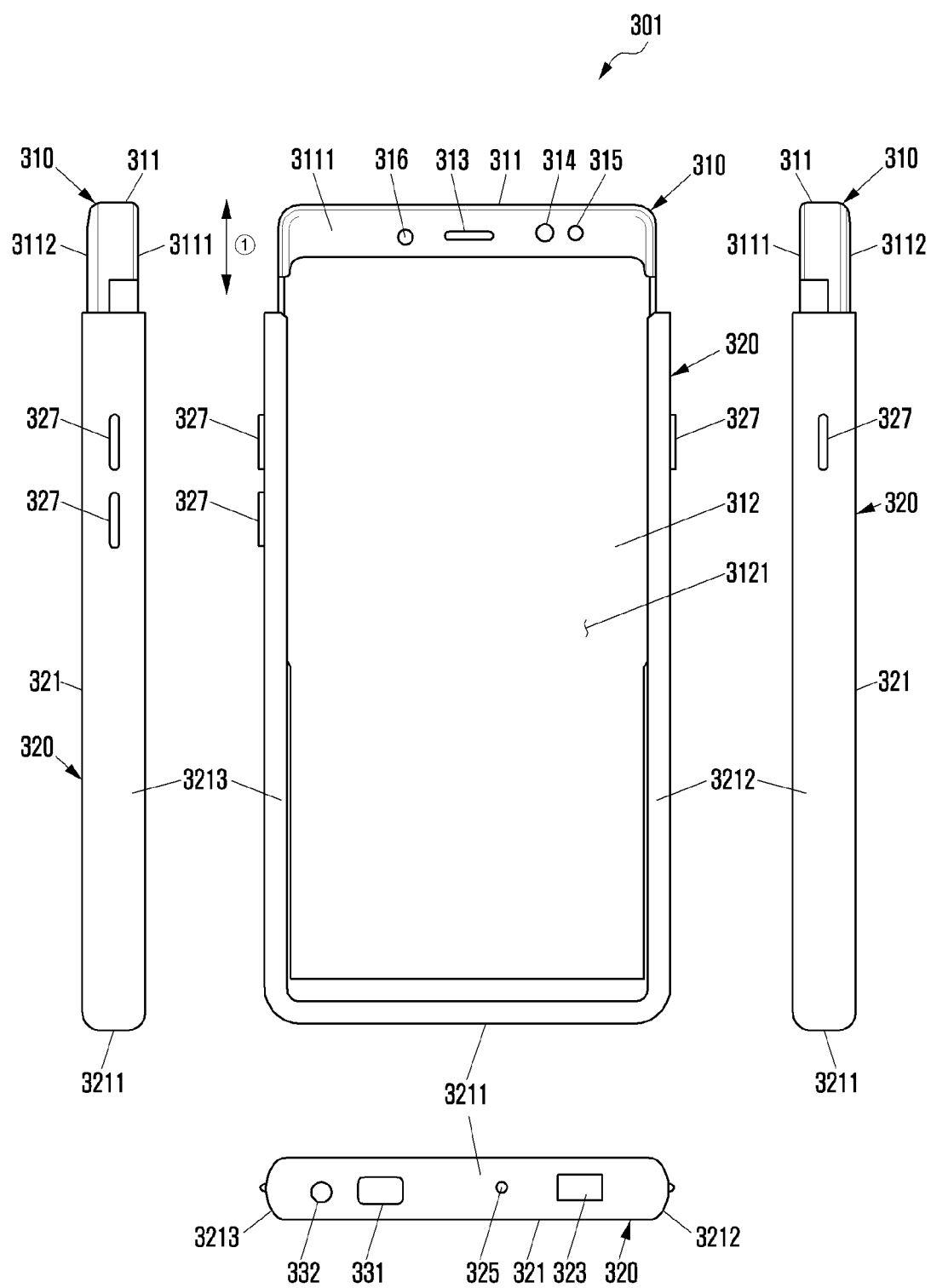
FIGS. 3A and 3B are diagrams illustrating open and closed states of an electronic device according to various embodiments of the disclosure.
Figure 3B:
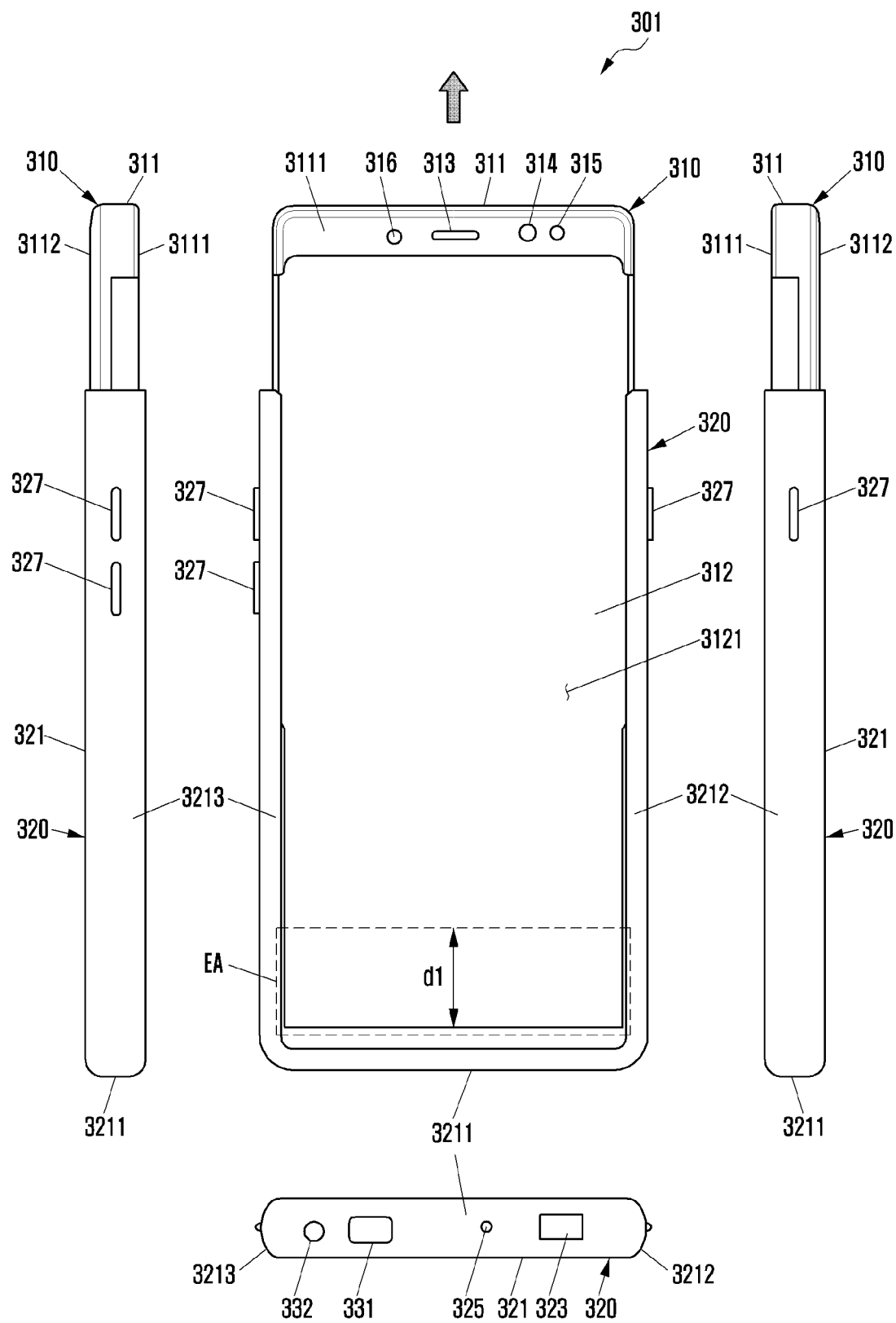
Figure 3C:
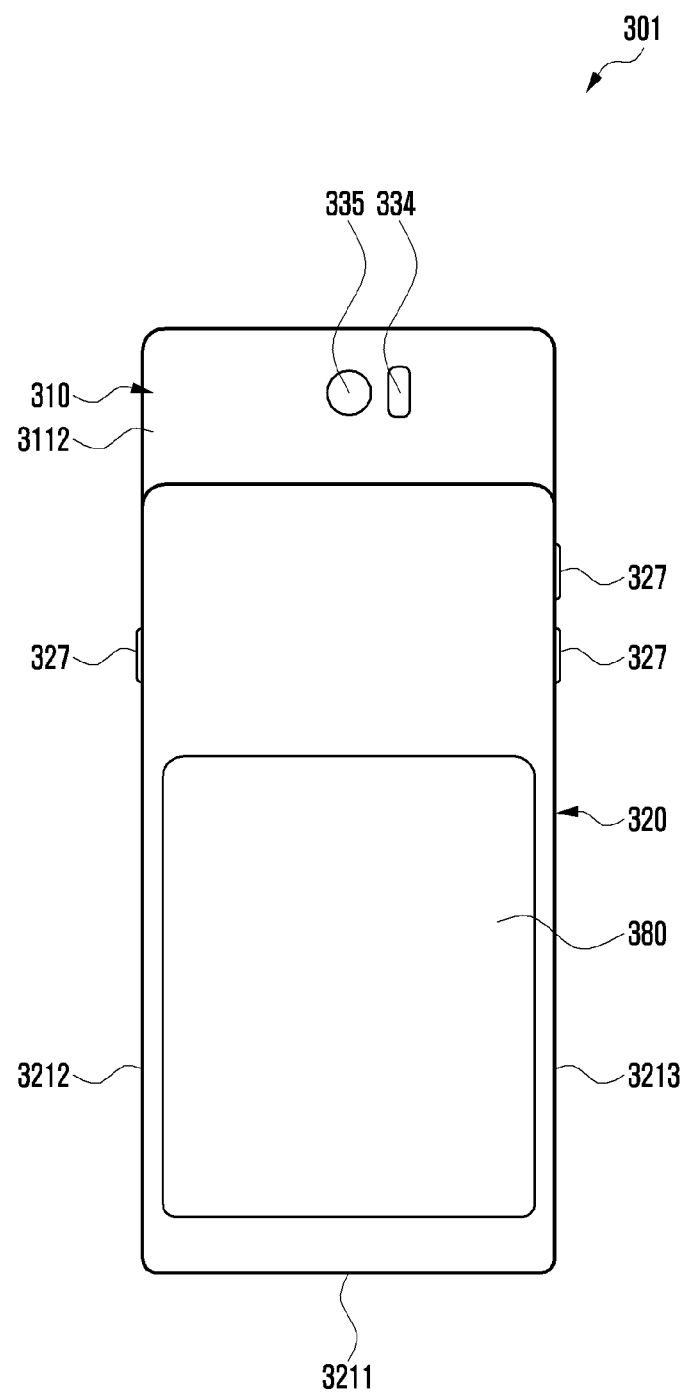
FIG. 3C is a perspective view illustrating the rear of an electronic device according to various embodiments of the disclosure.

FIGS. 3A and 3B are diagrams illustrating open and closed states of an electronic device according to various embodiments of the disclosure. FIG. 3C is a perspective view illustrating the rear of an electronic device according to various embodiments of the disclosure.

FIG. 3A illustrates a first structure 310 in a closed state with respect to a second structure 320, and FIG. 3B illustrates a first structure 310 in an open state with respect to the second structure 320.

Referring to FIGS. 3A, 3B, and 3C, the electronic device 301 (e.g., the electronic device 101 in FIG. 1) may include a first structure 310 and a second structure 320, which is movably arranged in the first structure 310. According to an embodiment, the first structure 310 may be arranged to be able to reciprocate based on the second structure 320 by a specific distance d1 in the direction shown in the drawing.

According to various embodiments, a first plate 311 of the first structure 310 may include a first surface 3111 and a second surface 3112 facing the direction opposite the first surface 3111. According to an embodiment, the second structure 320 may include a second plate 321, a first sidewall 3211 extending to the second plate 321, a second sidewall 3212 extending to the first sidewall 3211 and the second plate 321, and a third sidewall 3213 extending to the first sidewall 3211 and the second plate 321 while being parallel to the second sidewall 3212, or a second rear plate 380 (e.g., a rear window). According to an embodiment, the second plate 321, the first sidewall 3211, the second sidewall 3212, and the third sidewall 3213 may be formed to have one side that is open to accommodate at least a portion of the first structure 310. According to an embodiment, the second sidewall 3212 or the third sidewall 3213 may be omitted. According to an embodiment, the second plate 321, the first sidewall 3211, the second sidewall 3212, or the third sidewall 3213 may be formed in an integral structure. As another example, the second plate 321, the first sidewall 3211, the second sidewall 3212, or the third sidewall 3213 may be formed as separate structures, and may then be coupled to each other. According to an embodiment, the second rear plate 380 may cover at least a portion of the display 312.

According to an embodiment, since the first structure 310 is able to move in a first direction (e.g., the direction ①) parallel to the second plate 321 and the second sidewall 3212 with respect to the second structure 320 so as to change between an open state and a closed state, and may move to be spaced a first distance apart from the first sidewall 3211 in the closed state and to be spaced a second distance greater than the first distance apart from the first sidewall 3211 in the open state.

According to an embodiment, the electronic device 301 may include at least one of a display 312, audio modules 313 and 323, camera modules 315 and 335, an indicator 316 (e.g., an LED device), sensor modules 314 and 334, a key input device 327, or connector holes 331 and 332.

According to an embodiment, the display 312 may include a planar portion 3121 extending across at least a portion of the first surface 3111 and arranged on the first surface 3111, and a bendable portion extending from the planar portion 3121 to the space between the first sidewall 3211 and the first structure 310 in the closed state. According to an embodiment, if the first structure 310 moves from the closed state to the open state, at least a portion of the bendable portion of the display may be configured to move toward the planar portion by a specific view region E3 in order to form a substantially planar surface between the planar portion 3121 and the first sidewall 3211 when viewed from the top of the first plate 311. The display 312 may be arranged to be connected or adjacent to a touch sensing circuit, a pressure sensor capable of measuring the intensity (pressure) of a touch, and/or a digitizer detecting a magnetic field-type stylus pen.

According to an embodiment, the audio modules 313, 323, and 325 may include speaker holes 313 and 323 or a microphone hole 325. The speaker holes 313 and 323 may include a receiver hole 313 or an external speaker hole 323. A microphone for receiving external sound may be provided in the microphone hole 325, and in some embodiments, a plurality of microphones may be provided therein in order to detect the direction of a sound. In some embodiments, the speaker holes 313 and 323 and the microphone hole 325 may be implemented as a single hole, or speakers not including the speaker holes 313 and 323 (e.g., piezo speakers) may be included. According to an embodiment, the receiver hole 313 may be disposed in the first structure 310, and the external speaker hole 323 or the microphone hole 325 may be arranged in the second structure 320. According to another embodiment, the external speaker hole 323 may be disposed on the second surface 3112 of the first plate 311 or on the side surface of the first structure 310. According to another embodiment, the microphone hole 325 may be disposed on the side surface of the first structure 310.

According to an embodiment, the sensor modules 314 and 334 may produce electrical signals or data values corresponding to the internal operating state of the electronic device 301 or the external environmental state. The sensor modules 314 and 334 may include, for example, a first sensor module 314 (e.g., a proximity sensor) disposed on the first surface 3111 of the first plate 311 and/or a second sensor module (not shown) (e.g., a fingerprint sensor) and/or a third sensor module 334 (e.g., an HRM sensor) disposed on the second surface 3112 of the first plate 311. The electronic device 301 may further include at least one of sensor modules that are not shown, for example, a gesture sensor, a gyro sensor, an atmospheric sensor, a magnetic sensor, an acceleration sensor, a grip sensor, a color sensor, an infrared (IR) sensor, a biometric sensor, a temperature sensor, a humidity sensor, or an illuminance sensor.

According to an embodiment, the camera modules 315 and 335 may include a first camera device 315 disposed on the first surface 3111 of the first plate 311 and a second camera device 335 disposed on the second surface 3112. The first camera device 315 or the second camera device 335 may include one or more lenses, an image sensor, and/or an image signal processor. According to an embodiment, the second camera device 335 may be disposed on one surface of the second structure 320.

According to an embodiment, the key input device 327 may be disposed on the second sidewall 3212 or the third sidewall 3213 of the second structure 320. The electronic device 301 may include a key input device that is not shown, such as a home key button or a touch pad arranged near the home key button. According to another embodiment, at least part of the key input device 327 may be positioned in an area of the first structure 310.

According to an embodiment, the indicator 316 may be disposed on the first surface 3111 of the first plate 311. The indicator 316 may include, for example, an LED in the case where information on the state of the electronic device 301 is to be provided in the form of light.

According to an embodiment, the connector holes 331 and 332 may include a first connector hole 331 for receiving a connector (e.g., a USB connector) for transmitting and receiving power and/or data to and from an external electronic device, and/or a second connector hole (or an earphone jack 332) for receiving a connector for transmitting and receiving audio signals to and from an external electronic device. According to an embodiment, the first connector hole 331 or the second connector hole 332 may be disposed on the first sidewall 3211 of the second structure 320. According to another embodiment, the first connector hole 331 or the second connector hole 332 may be formed on the sidewall of the first structure 310.

Figure 4:
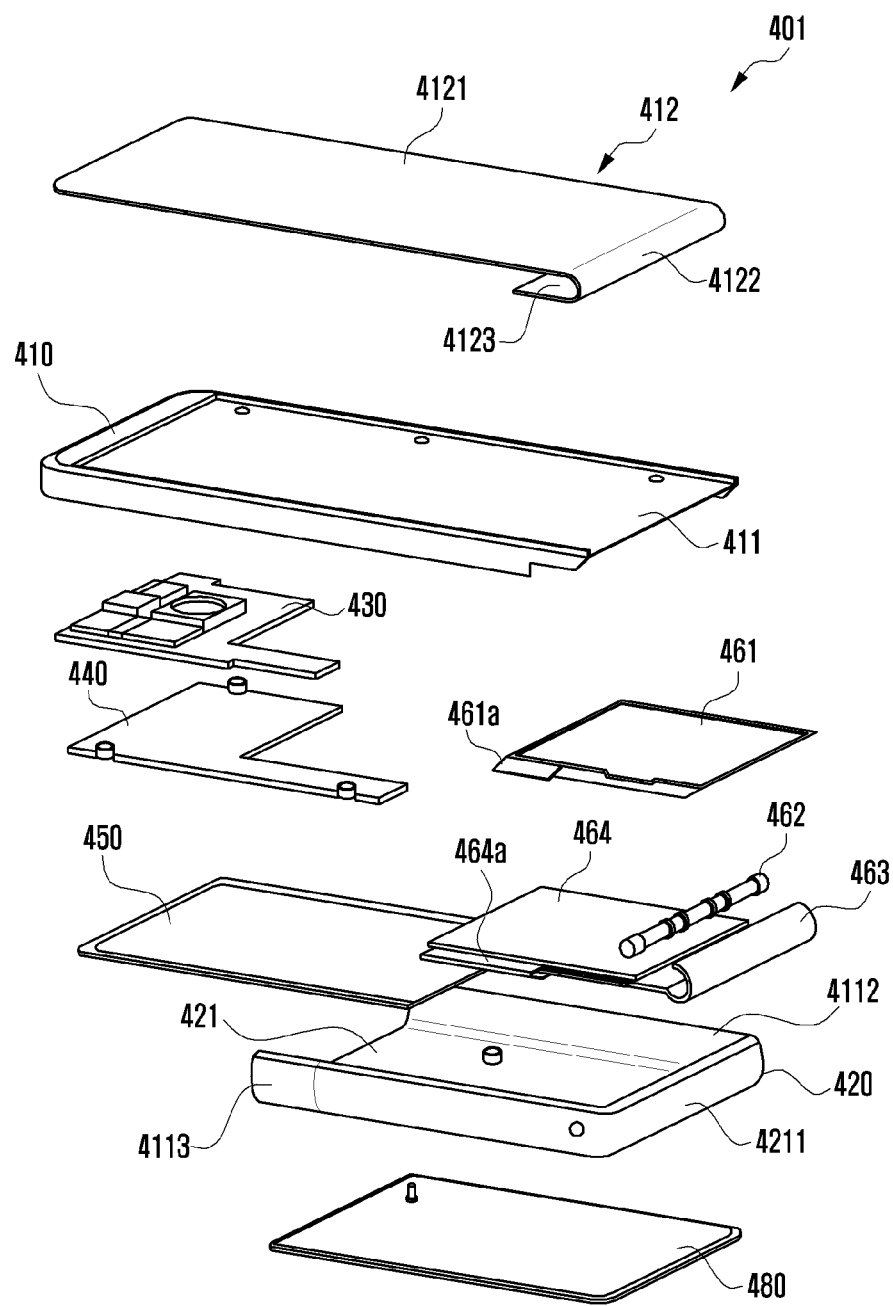
FIG. 4 is an exploded perspective view of an electronic device according to various embodiments of the disclosure.

FIG. 4 is an exploded perspective view of an electronic device according to various embodiments of the disclosure.

Referring to FIG. 4, an electronic device 401 (e.g., the electronic device 101 in FIG. 1 or the electronic device 301 in FIGS. 3A to 3C) may include a display 412, a first structure 410, a first plate 411, a second structure 420, a second plate 421, a printed circuit board 430, a support member 440 (e.g., a rear case), a first rear plate 450, a first hinge plate 461, a roller 462, a second hinge plate 464, or a second rear plate 480 (e.g., a rear window). In some embodiments, the electronic device 401 may exclude at least one of the elements (e.g., the first support member 440 or the first rear plate 450), or may further include other elements.

The display 412 may include a first surface 4121, a second surface 4122, and a third surface 4123, and the view region of a screen may vary based on the exposed area according to various embodiments. The first surface 4121 and the third surface 4123 may form a flat surface, and the second surface 4122 may form a curved surface.

The first structure 410 may include the first plate 411. The first structure 410 may be formed of, for example, a metal material and/or a non-metal material (e.g., a polymer). The first plate 411 may have the display 412 coupled to one surface thereof and the printed circuit board 430 coupled to the opposite surface thereof. The first plate 411 may be connected to one side of a multi-bar 463 that is connected at least to the second surface 4122 of the display 412. The first structure 410 may fix the second hinge plate 464.

The first hinge plate 461 may support the multi-bar 463 when the display 412 is extended. The first hinge plate 461 and a first hinge plate fixing portion 461a may be integrally formed. The first hinge plate fixing portion 461a may be connected to a second hinge plate fixing portion 464a provided in the second hinge plate 464.

The roller 462 may guide or support the multi-bar 463 to move in a predetermined radius. The roller 462 may be connected to the second hinge plate fixing portion 464a or the first hinge plate 461.

The multi-bar 463 may be formed of a plurality of straight bars. The multi-bar 463 may support at least a portion of the second surface 4122 of the display 412. One side of the multi-bar 463 may be connected to the second hinge plate 464, and the opposite side thereof may be connected to the first structure 410.

The second hinge plate 464 may support the third surface 4123 of the display 412. When the display 412 is extended, the second hinge plate 464 may be moved by interworking with the multi-bar 463, thereby extending a screen. The second hinge plate 464 may be formed as a separate component from the second hinge plate fixing portion 464a. The second hinge plate 464 may be fixed to the first structure 410 so as to allow the second hinge plate 464 to slide.

The second structure 420 may be formed to surround at least a portion of the first structure 410, the second hinge plate 464, and the multi-bar 463. According to an embodiment, the second structure 420 may include a second plate 421, a first sidewall 4211 extending to the second plate 421, a second sidewall extending to first sidewall 4211 and the second plate 421, and a third sidewall extending to the first sidewall 4211 and the second plate 421 while being parallel to the second sidewall 4212. The second structure 420 may have a space formed to accommodate configurations such as an antenna and the like in a space that does not overlap the multi-bar 463. The second structure 420 may include a second rear plate 180 covering at least a portion of the third surface 4123 of the display 412.

The second rear plate 480 may include a material that does not transmit light in the case where information is not required to be displayed on the third surface 4123 of the display 412. As another example, the second rear plate 480 may be formed of a material that transmits light in order to display information on the third surface 4123 of the display 412. The second rear plate 480 may be integrally formed with the second structure 420.

The support member 440 may be interposed between the printed circuit board 430 and the first rear plate 450.

A processor (e.g., the processor 120 in FIG. 1), a memory (e.g., the memory 1130 in FIG. 1), and/or an interface (e.g., the interface 177 in FIG. 1) may be mounted on the printed circuit board 430. The processor may include, for example, one or more of a central processing unit, an application processor, a graphic processing unit, an image signal processor, a sensor hub processor, or a communication processor. The first structure 410 may be guided and moved through the first hinge plate 461 when the display 412 is extended or contracted.

The memory may include, for example, volatile memory or non-volatile memory.

The interface may include, for example, a high-definition multimedia interface (HDMI), a universal serial bus (USB) interface, an SD card interface, and/or an audio interface. The interface, for example, may electrically or physically connect the electronic device 401 to an external electronic device, and may include a USB connector, an SD card/MMC connector, or an audio connector.

Figure 5:
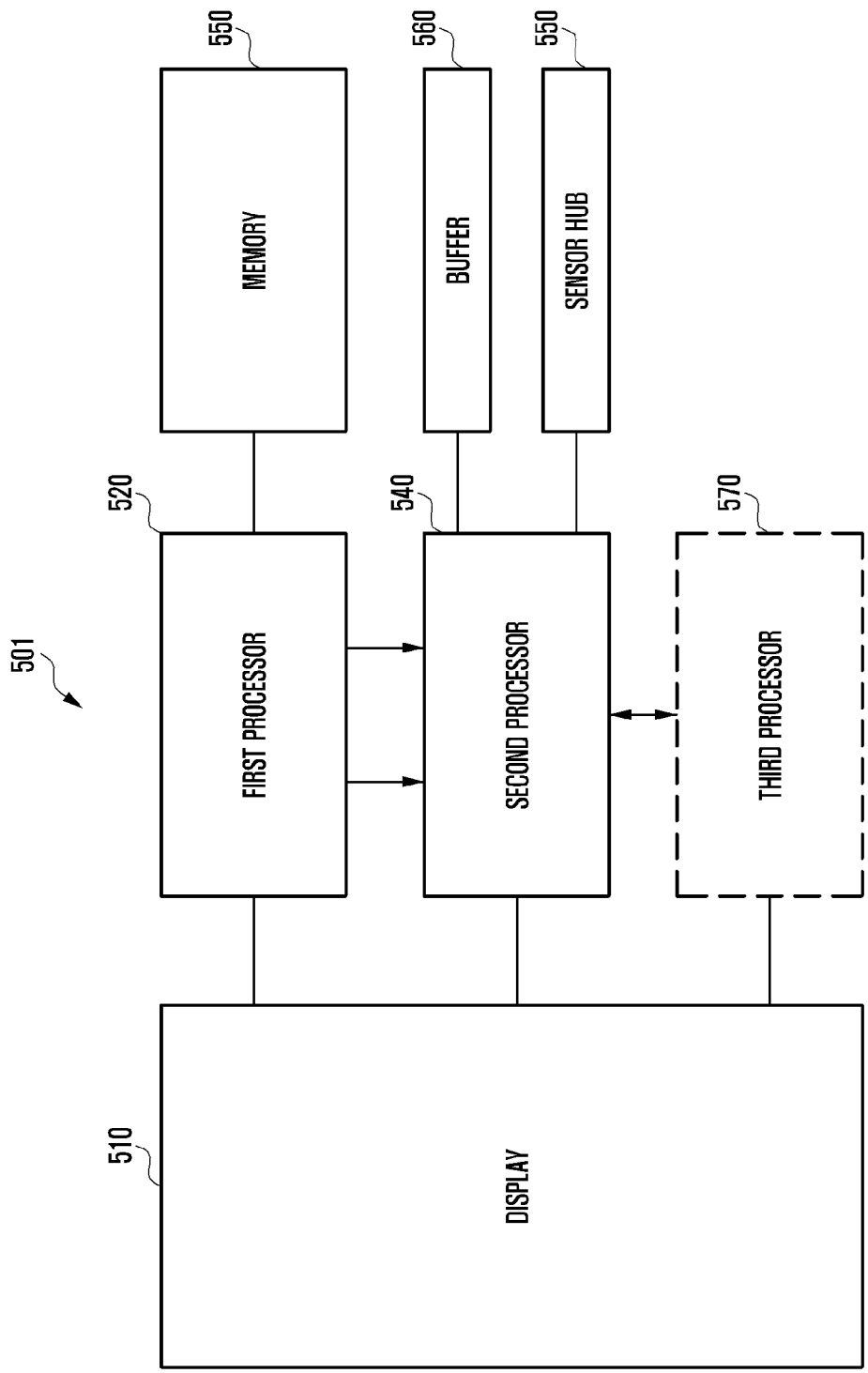
FIG. 5 is a block diagram of an electronic device according to various embodiments of the disclosure.

FIG. 5 is a block diagram of an electronic device according to various embodiments of the disclosure.

Referring to FIG. 5, an electronic device 501 (e.g., the electronic device 101 in FIG. 1, the electronic device 301 in FIGS. 3A to 3C, and/or the electronic device 401 in FIG. 4) according to an embodiment may include a display 510, a first processor 520, a memory 530, a second processor 540, a buffer 560, and a sensor hub 550.

According to an embodiment, the display 510 (e.g., the display device 160 in FIG. 1, the display 210 in FIG. 2, the display 312 in FIGS. 3A to 3C, and/or the display 412 in FIG. 4) may display image data, and may be implemented using any one of a liquid crystal display (LCD), a light-emitting diode (LED) display, an organic light-emitting diode (OLED) display, or a micro-electro mechanical systems (MEMS) display, a flexible display, or an electronic paper display, but is not limited thereto.

The display 510 may include a touch screen panel (not shown), and the touch screen panel may detect a touch input or a hovering input on the window (not shown) provided on the front surface of the display 510.

According to an embodiment, the memory 530 (e.g., the memory 130 in FIG. 1) may include volatile memory and non-volatile memory, and is not limited to a specific implementation. The memory 530 may be electronically connected to the first processor 520. As another example, the memory 530 may store various instructions which may be executed by the first processor 520. For example, the instructions may include control commands such as arithmetic and logical operations, data movement, input/output, and the like, which may be recognized by a control circuit, and may be defined in a framework stored in the memory 530.

According to an embodiment, the first processor 520 (e.g., the processor 120 in FIG. 1) may perform operations and data processing, which may be implemented in the electronic device 501. The operations of the first processor 520 may be performed by loading instructions stored in the memory 530. The first processor 520 may include any one of an application processor (AP), a communication processor, or a main processor.

According to an embodiment, the first processor 520 may generate and render image data to be displayed on the display 510, thereby providing the image data to the second processor 520. The second processor 540 may drive the display 510 such that the image data is displayed on the display 510, based on the image data received from the first processor 520.

According to an embodiment, the second processor 540 (e.g., the display driver IC 230 in FIG. 2) may be a display driving IC (DDI) for driving the display 510. The display driving circuit may be an integrated circuit that performs a control function of regulating a transistor mounted to each pixel (or subpixel) included in the display 510 such that each pixel emits light of a predetermined color. The second processor 540 may receive image data from the first processor 520 periodically or when a specific event occurs, and may control the driving voltage for each pixel in order to output the image data to at least a portion of the display or the entire area thereof.

According to an embodiment, the buffer 560 (e.g., the memory 233 in FIG. 2) may be electrically connected to the second processor 540. The buffer 560 may store image data transmitted from the first processor 520. The buffer 560 may include a memory space corresponding to the resolution and/or the number of color gradations of the display 510. The buffer 560 may store at least part of the image data, for example, in units of frames.

According to an embodiment, the sensor hub 550 (e.g., the sensor module 176 in FIG. 1 and/or the sensor modules 314 and 334 in FIGS. 3A to 3C) may include a micro controller unit (MCU), and may control one or more sensors.

The sensor hub 550 may collect sensing information sensed by one or more sensors, and may control the operations of one or more sensors.

According to an embodiment, the sensor hub 550 may transmit sensing information sensed by one or more sensors to the first processor 520 or the second processor 540. The first processor 520 may identify a change in the structure of the display 510 through the sensing information transmitted from the sensor hub 550.

According to an embodiment, the display 510 may include an open region, which is always exposed on the front surface of the electronic device 501, and a hidden region, which is accommodated inside the electronic device 501 and is exposed on the front surface of the electronic device or hidden therein depending on a change in the structure of the display 510.

According to an embodiment, the first processor 520 may define a size corresponding to the entire area of the display 510 including the open region and the hidden region as the maximum resolution. If the first processor 520 displays image data on the display in the area corresponding to the maximum resolution, the first processor 520 may control the second processor 540 to be driven at the minimum frame rate frequency.

According to an embodiment, the first processor 520 may identify a view region of the display 510 on which image data is to be displayed according to the structure of the display 510. For example, the view region indicates the area on which image data is displayed to provide information to a user, and the area of the view region may vary depending on a change in the structure of the display.

According to an embodiment, the first processor 520 may identify the view region on which image data is to be displayed depending on a change in the structure of the display through sensing information, and may perform control to change the frame rate of the second processor 540 according to the view region. The first processor 520 may render image data corresponding to the area of the view region, and may transmit a control signal to the second processor 540 so as to display the image data on the view region.

For example, in the case where the hidden region of the display 510 is not exposed to the outside while being accommodated inside the electronic device 501, the first processor 520 may render image data corresponding to the area of the open region exposed on the front surface, and may not render image data for the hidden region. If the hidden region is exposed to the outside, the first processor 520 may render image data corresponding to an area including the open region and the exposed hidden region. If the view region on which the image data is to be displayed has the maximum area according to a change in the structure of the display 510, the first processor 520 may control the second processor 540 to be driven at the minimum frame rate frequency. If the view region is reduced from the maximum area according to a change in the structure of the display 510, the first processor 520 may control the second processor 540 to be driven at a frame rate frequency relatively higher than the minimum frame rate frequency.

According to various embodiments, the electronic device 501 may further include a third processor 570 electrically connected to the first processor 520 and the second processor 540.

The third processor 570 may be a display driving IC (DDI) for driving at least part of the display 510. The third processor 570 may be an integrated circuit that performs a control function of regulating the transistor mounted to each pixel (or subpixel) included in the display 510 such that each pixel emits light of a predetermined color.

The third processor 570 may be activated/deactivated under the control of the first processor 520. The third processor 570 may be activated by the first processor 520 to receive image data from the first processor 520 and perform control to display information related to the image data on at least a portion of the display. The third processor 570 may further include an electrically connected buffer (not shown). The third processor 570 may operate in the same manner as at least some of the configurations and/or functions of the second processor 540.

Figure 6:
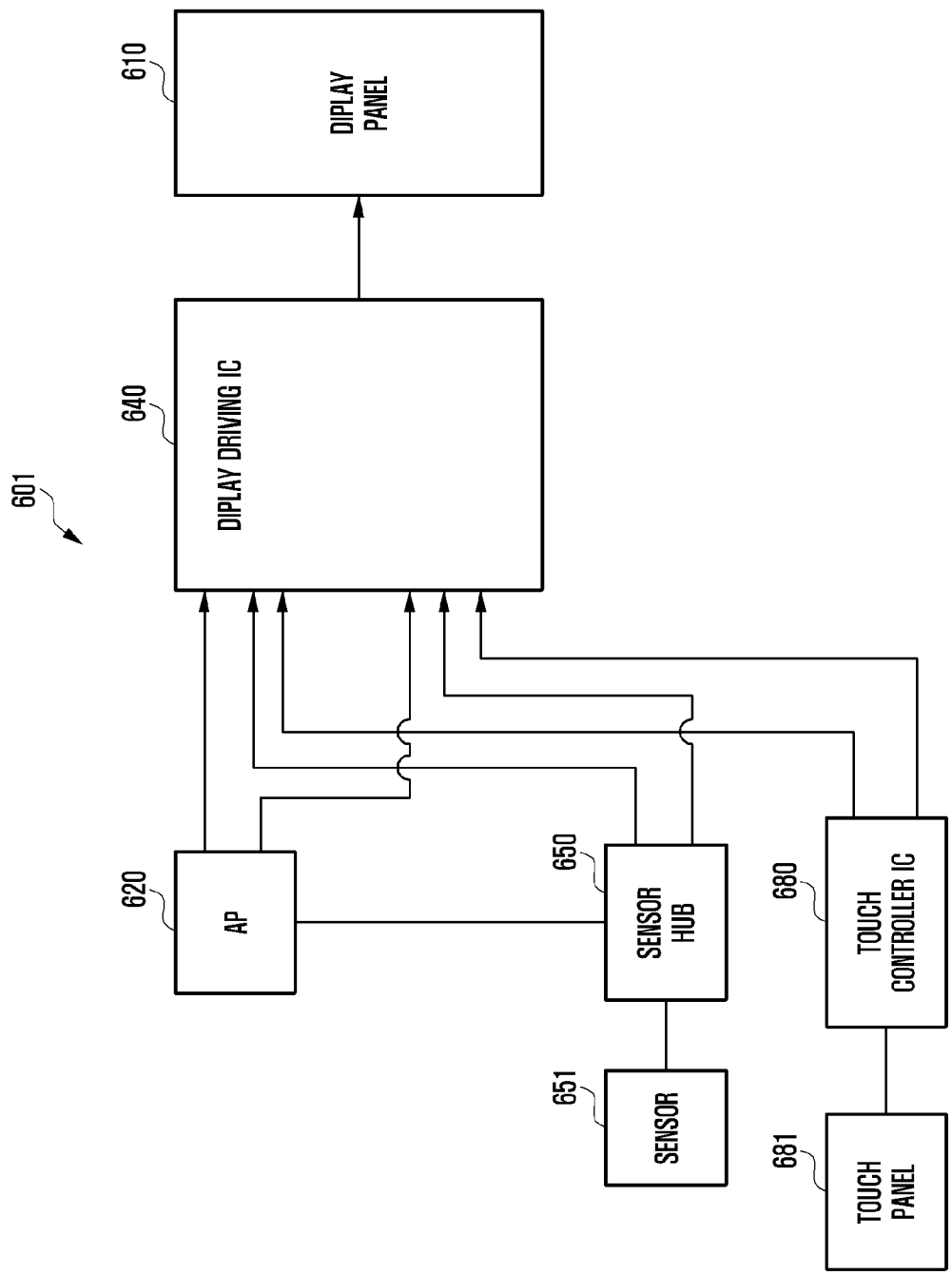
FIG. 6 is a block diagram of an electronic device according to another embodiment of the disclosure.

FIG. 6 is a block diagram of an electronic device according to another embodiment of the disclosure.

Referring to FIG. 6, an electronic device 601 (e.g., the electronic device 101 in FIG. 1, the electronic device 301 in FIGS. 3A to 3C, the electronic device 401 in FIG. 4, and/or the electronic device 501 in FIG. 5) according to various embodiments may include a display driving circuit 640 (e.g., the display driver IC 230 in FIG. 2 and/or the second processor 540 in FIG. 5), a display panel 610 (e.g., the display device 160 in FIG. 1, the display 210 in FIG. 2, the display 312 in FIGS. 3A and 3C, the display 412 in FIG. 4, and/or the display 510 in FIG. 5), an application processor (AP) 620 (e.g., the processor 120 in FIG. 1 and/or the first processor 520 in FIG. 5), a sensor hub 650 (e.g., the sensor module 176 in FIG. 1, the sensor modules 314 and 334 in FIGS. 3A to 3C, and/or the sensor hub 550 in FIG. 5), a touch controller IC 680 (e.g., the input device 150 in FIG. 1 and/or the touch circuit 250 in FIG. 2), and a touch panel 681.

According to an embodiment, the display driving circuit 640 may include an integrated circuit for driving the display panel 610. The display driving circuit 640 may supply the image data received from the application processor 620 to the display panel 610 at a predetermined number of frames.

The display panel 610 may include an open region, which is always exposed on the front surface of the electronic device 601, and a hidden region, which is accommodated inside the electronic device 601 and is exposed on the front surface or hidden therein depending on the structure of the display 610.

According to an embodiment, the display driving circuit 640 may include a graphic buffer (e.g., including at least part of the configuration of the buffer in FIG. 3), and may store data provided from the application processor 620, the sensor hub 650, or the touch controller IC 680.

According to an embodiment, the display driving circuit 640 may be configured to select some of the image data stored in the graphic buffer and output the selected part to a specified view region of the display panel 610. The display driving circuit 640 may select image data corresponding to a specified data size from a specific data address as the image data to be output to the display panel 610. The display driving circuit 640 may change at least one piece of partial image data to be output to a designated region of the display panel 610 according to a specified order.

According to an embodiment, the sensor hub 650 may include a micro controller unit (MCU). The sensor hub 650 may be connected to at least one sensor 651, and may control the operation of at least one connected sensor 651 and transmit sensing information received from at least one sensor to the application processor 620 or the display driving circuit 640. The at least one sensor 651 electrically connected to the sensor hub 650 may include, for example, a temperature/humidity sensor, a biometric sensor, an atmospheric sensor, a gyro sensor, a motion sensor, a proximity sensor, or an infrared sensor.

According to an embodiment, the touch controller IC 680 may control the touch panel 681 connected to correspond to the display panel 610. The touch controller IC 680 may include at least some of the configurations and/or functions of the input device 150 in FIG. 1 and/or the touch sensor IC 553 in FIG. 2. For example, the touch controller IC 680 may process touch gesture information input through the touch panel 681, or may control the operation of the touch panel 681. The touch controller IC 680 may produce image data to be output through the display panel 610, based on touch sensing information detected in the touch panel 681. For example, if touch gesture information is received from the touch panel 681, the touch controller IC 680 may transmit coordinate data of the position corresponding to the touch gesture information to the display driving circuit 640.

According to an embodiment, the application processor 620, the sensor hub 650, or the touch controller 680 may provide data to the graphic buffer of the display driving circuit 640 through a high-speed serial interface (HiSSI) such as a mobile industry processor interface (MIPI). As another example, the application processor 620, the sensor hub 650, or the touch controller 680 may transmit control information for selecting some of the image data through a low-speed serial interface (LoSSI) such as a serial peripheral interface (SPI) or an inter-integrated circuit (I2C).

According to an embodiment, the application processor 620 may produce image data to be displayed on the display panel 610, and may render the same, thereby providing the image data to the display driving circuit 640. The application processor 620 may include at least some of the configurations and/or functions of the first processor 320 in FIG. 2.

According to an embodiment, the application processor 620 may identify that the area of the view region on which the image data is to be displayed in the display panel 610 has been changed due to a change in the structure of the display panel 610, based on the sensing information transmitted from the sensor hub 650. The application processor 620 may determine the frame rate frequency of the display driving panel to correspond to the changed area of the view region, and may control the display driving circuit 640 to be driven at the determined frame rate frequency.

According to an embodiment, the electronic device 601 may have the maximum resolution configured to correspond to the maximum area of the display 610 including both the open region and the hidden region of the display panel 610. If image data is to be displayed on the view region, having the maximum area, including the open region and the hidden region, the application processor 620 may control the display driving circuit 640 to be driven at the minimum frame rate frequency allowable in the display driving circuit 640. In the case where image data is displayed on the view region having the minimum area corresponding to the open region, the application processor 620 may control the display driving circuit 640 to be driven at a frame rate frequency, which is relatively higher than the minimum frame rate frequency.

Figure 7:
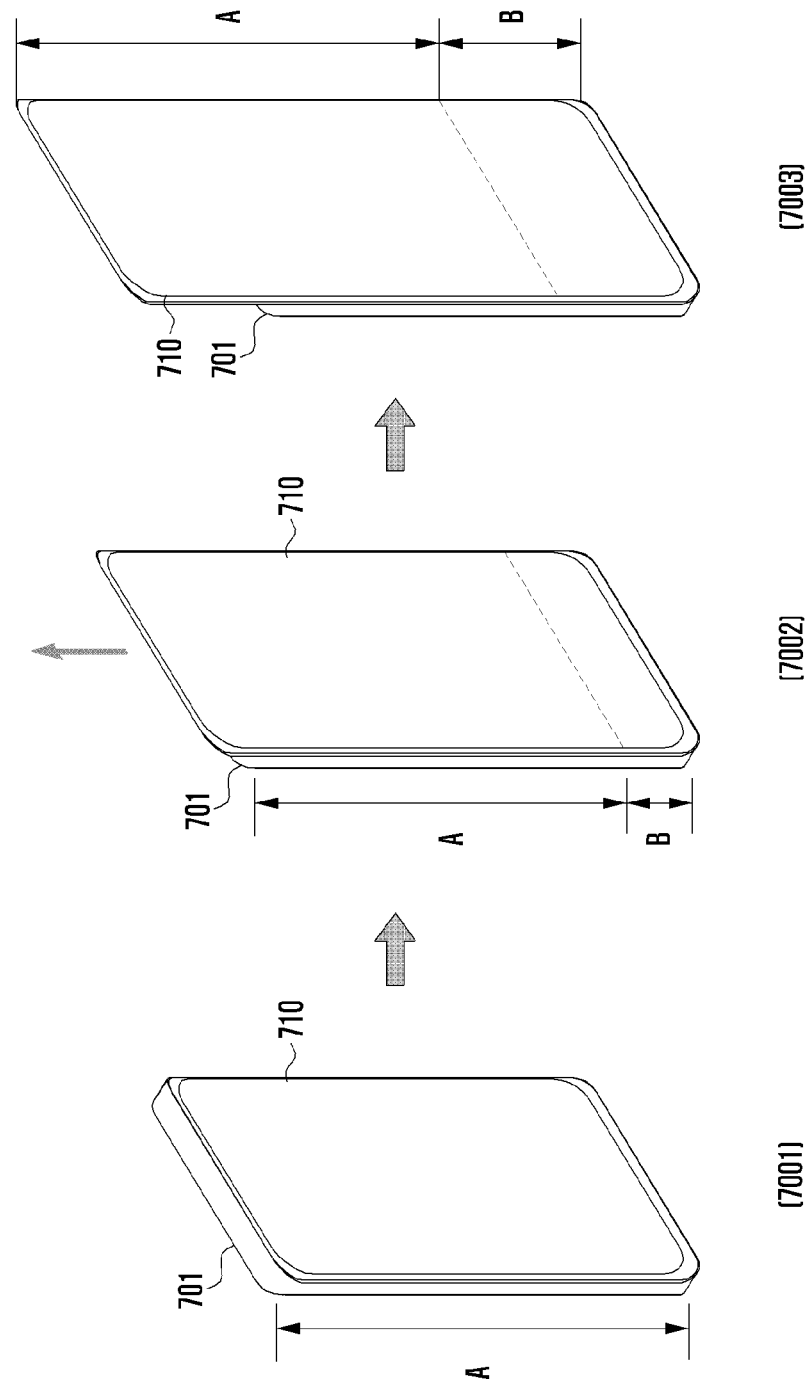
FIG. 7 is a diagram illustrating an example of a change in area of a view region of a display depending on a change in the structure of the display according to various embodiments of the disclosure.

FIG. 7 is a diagram illustrating an example of a change in area of a view region of a display depending on a change in the structure of the display according to various embodiments of the disclosure.

Referring to FIG. 7, an electronic device 701 (e.g., the electronic device 101 in FIG. 1, the electronic device 301 in FIGS. 3A to 3C, the electronic device 401 in FIG. 4, the electronic device 501 in FIG. 5, and/or the electronic device 601 in FIG. 6) according to various embodiments may be a device implemented using a display panel in which a view region of a display 710 (e.g., the display device 160 in FIG. 1, the display 210 in FIG. 2, the display 312 in FIGS. 3A to 3C, the display 412 in FIG. 4, the display 510 in FIG. 5, and/or the display panel 610 in FIG. 6) is able to be extended depending on a change in the structure of the display 710. Hereinafter, for convenience of description, a description will be made based on a display panel in which the view region of the display 710 is able to be extended depending on a change in the structure of the display 710 using sliding driving or rolling driving, but the display structure may be implemented in various forms. For example, the display panel may be a flexible display panel, but is not limited thereto.

According to an embodiment, the display 710 may include an open region A, which is always exposed on the front surface of the electronic device 701, and a hidden region B, which is accommodated inside the electronic device 701 and is exposed on the front surface or hidden therein depending on the structure of the display 710. The hidden region B of the display 710 may be hidden inside a housing of the electronic device 701, and may be moved in one direction by sliding driving or rolling driving to then be exposed to the outside of the housing of the electronic device 701.

According to an embodiment, as shown in 7001, only the open region A of the display 710 may be exposed on the front surface of the electronic device 701. In the case of 7001, the view region for displaying image data in the electronic device 701 may have an area corresponding to the size of the open region A.

According to an embodiment, if a user pushes the display 710 upwards in order to extend the view region of the display 710, the hidden region B hidden inside the housing of the electronic device 701 may be moved to the outside of the housing. For example, the display 710 may have a structure in which the view region is extended as shown in 7002. In the case of 7002, the view region for displaying image data in the electronic device 701 may have the area including at least a portion of the hidden region B, as well as the open region A, which is always exposed on the front surface. In the case of the structure of the display 710 in which the hidden region B is fully exposed on the front surface of the electronic device 701, as shown in 7003, the view region may include the entire areas of the open region A and the hidden region B.

As shown in 7003, the electronic device 701 according to an embodiment may define a size corresponding to the entire area of both the open region A and the hidden region B as the maximum resolution. In the case of the structure of the display 710 in which the view region and the maximum resolution are matched one to one as shown in 7003, the electronic device 701 may control the display processor (e.g., the display driver IC 230 in FIG. 2, the second processor 540 in FIG. 5, and/or the display driving circuit 640 in FIG. 6) to be driven at the minimum frame rate frequency allowable in the display processor, thereby displaying the image data. The electronic device 701 may identify that the area of the view region of the display 710 has been changed according to a change in the structure of the display 710, and may perform control to change the frame rate frequency of the display processor according to the changed area of the view region. For example, if the area of the view region is reduced from 7003 to 7001, the electronic device 701 may perform control for driving at a frame rate frequency relatively higher than the minimum frame rate frequency.

Figure 8:
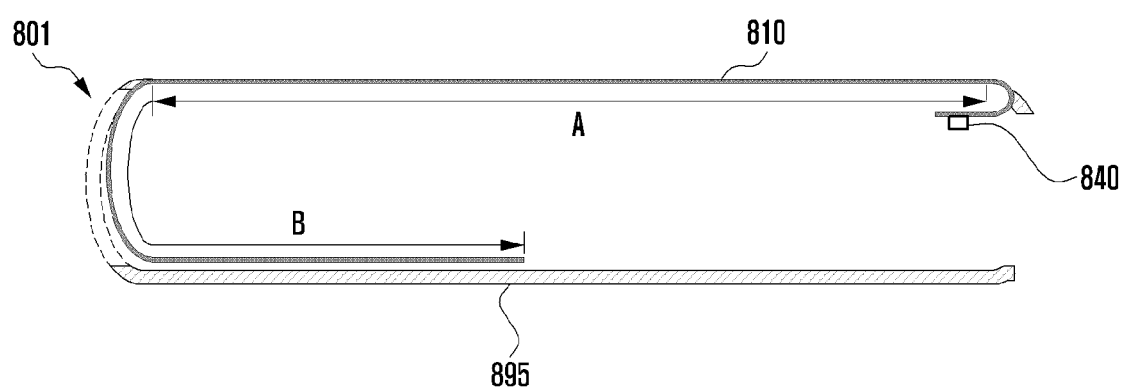
FIG. 8 is a diagram schematically illustrating the cross-section of a display of an electronic device according to various embodiments.

FIG. 8 is a diagram schematically illustrating the cross-section of a display of an electronic device according to various embodiments.

Referring to FIG. 8, an electronic device 801 (e.g., the electronic device 101 in FIG. 1, the electronic device 301 in FIGS. 3A to 3C, the electronic device 401 in FIG. 4, the electronic device 501 in FIG. 5, and/or the electronic device 601 in FIG. 6) having a flexible display according to various embodiments may be configured to include a housing 895 to which some or all of the configurations shown in FIG. 1 to FIG. 5 are mounted. The housing 895 may be implemented such that at least a portion of the display 810 is exposed in a first size (e.g., the open region A) on the front surface of the electronic device 801 and the remaining portions thereof (e.g., the hidden region B) may be accommodated inside the housing 895. A display driving circuit (DDI) 840 (e.g., the display driver IC 230 in FIG. 2, the second processor 540 in FIG. 5, and/or the display driving circuit 640 in FIG. 6) for displaying image data may be disposed at the end of one side of the display 810 (e.g., the display device 160 in FIG. 1, the display 210 in FIG. 2, the display 312 in FIGS. 3A to 3C, the display 412 in FIG. 4, the display 510 in FIG. 5, and/or the display panel 610 in FIG. 6). For convenience of description, elements mounted inside the housing 895, other than the display 810 and the display driving circuit 840, have been omitted from the drawing.

According to an embodiment, in the description made on the assumption that the part, in which the display driving circuit 840 is disposed, is an upper side of the electronic device 801 and that the part, in which the hidden region B is disposed, is a lower side of the electronic device 801, a user may move the display 810 toward the upper side. Then, the display 810 may be gradually moved toward the upper side and the hidden region B may be exposed on the front surface of the electronic device 801.

According to an embodiment, in the display structure in which the display driving circuit 840, the open region A, and the hidden region B are exposed to the outside of the housing, the display 810 may be driven such that the image data is displayed on the display 810 at a first frame rate (e.g., 50 hz or the like), which is the minimum frame rate corresponding to the maximum resolution. In the display structure in which only the display driving circuit 840 and the open region A are exposed and the hidden region B is accommodated, the display may be driven such that an image is displayed on the display at a second frame rate (e.g., 60 hz or the like), which is higher than the first frame rate.

Figure 9:
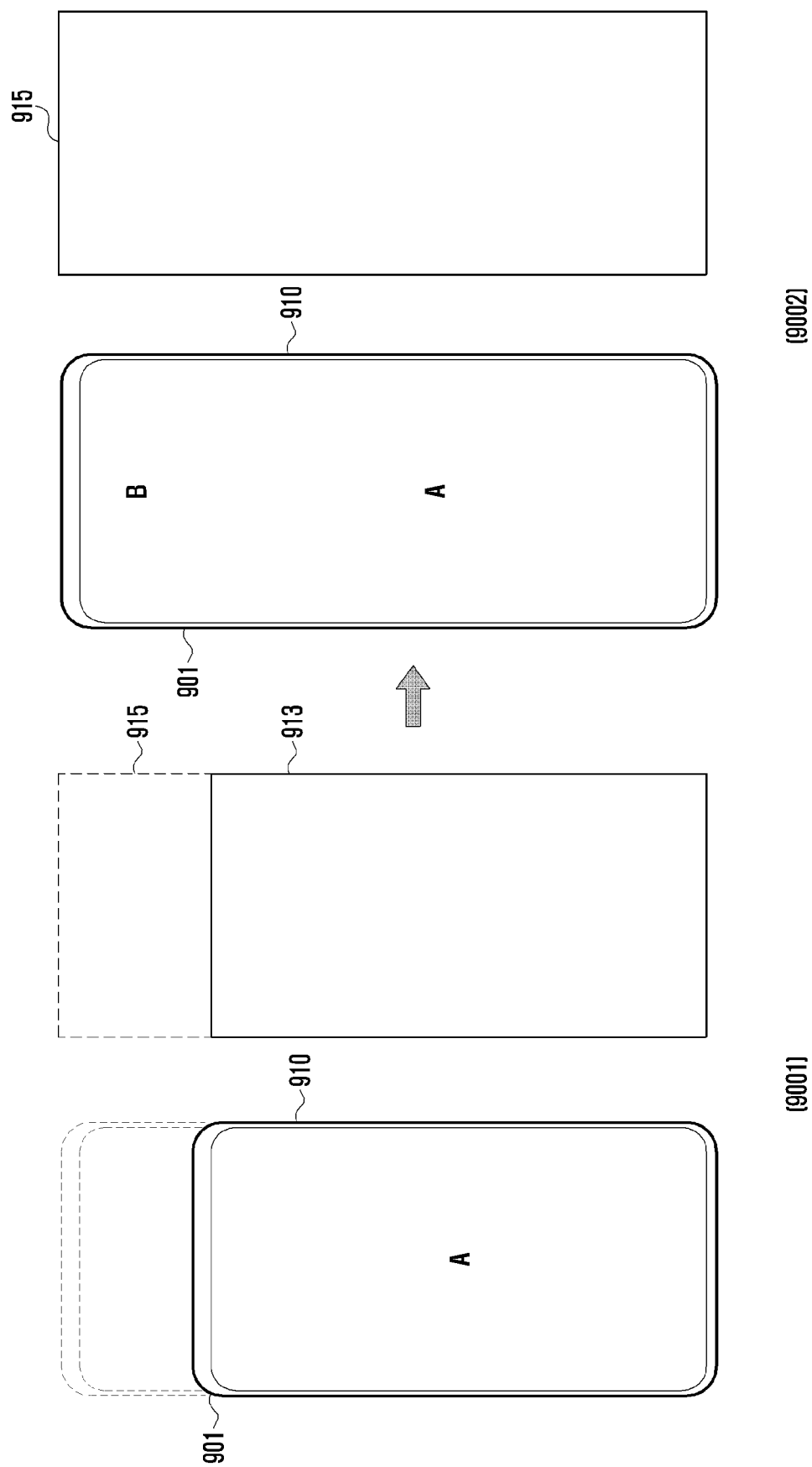
FIG. 9 is a diagram illustrating an example of the relationship between a view region and a maximum resolution depending on a change in the structure of a display of an electronic device according to various embodiments.

FIG. 9 is a diagram illustrating an example of the relationship between a view region and a maximum resolution depending on a change in the structure of a display of an electronic device according to various embodiments.

Referring to FIG. 9, the electronic device 901 according to various embodiments (e.g., the electronic device 101 in FIG. 1, the electronic device 301 in FIGS. 3A to 3C, the electronic device 401 in FIG. 4, the electronic device 501 in FIG. 5, and/or the electronic device 601 in FIG. 6) may configure the size corresponding to the entire area of the display 910 including the open region A and the hidden region B as the maximum resolution. In the display 910, the view region on which image data is to be displayed may have the minimum area 913 shown in 9001 and the maximum area 915 shown in 9002.

According to an embodiment, in the case of 9002 in which the view region is extended to the maximum area 915, since the maximum resolution and the view region are matched one to one, the electronic device 901 may be driven such that image data is displayed on the display 910 at the minimum frame rate allowable in the display driving circuit.

According to an embodiment, in the case of 9001 in which the view region has the minimum area 913, the maximum resolution and the view region are not matched one to one, and the maximum resolution may be defined as including a virtual region including the hidden region B. In the case of 9001, since the view region, on which the image is to be displayed, corresponds to the open region A, the hidden region B may not need to be rendered. Since the amount of image data to be rendered is reduced compared to 9002, having the maximum area, while being matched with resolution one to one, the electronic device 901 may control the display driving circuit to be driven at a frame rate relatively higher than the minimum frame rate allowable in the display driving circuit.

The electronic device 901 according to various embodiments may define the maximum resolution by including the hidden region B, and may change the frame rate of the driving circuit of the display, based on a change in the area of the view region on which image data is to be displayed, thereby suppressing flickering of the screen, which occurs when the resolution changes, because the resolution is not required to be changed in response to a change in the view region of the display.

The electronic device (e.g., the electronic device 101 in FIG. 1, the electronic device 301 in FIGS. 3A to 3C, the electronic device 401 in FIG. 4, the electronic device 501 in FIG. 5, the electronic device 601 in FIG. 6, the electronic device 701 in FIG. 7, the electronic device 801 in FIG. 8, and/or the electronic device 901 in FIG. 9) according to various embodiments may include a display (e.g., the display device 160 in FIG. 1, the display 210 in FIG. 2, the display 312 in FIGS. 3A to 3C, the display 412 in FIG. 4, the display 510 in FIG. 5, the display panel 610 in FIG. 6, the display 710 in FIG. 7, the display 810 in FIG. 8, or the display 910 in FIG. 9) including a first region (e.g., the open region A) exposed on the front surface of the electronic device and a second region (e.g., the hidden region B) that is accommodated inside the electronic device or exposed to the outside thereof, at least one sensor (e.g., the sensor module 176 in FIG. 1, the sensor modules 314 and 334 in FIGS. 3A to 3C, the sensor hub 550 in FIG. 5, or the sensor hub 650 in FIG. 6) for detecting a change in the display structure of the display, at least one display processor (e.g., the display driver IC 230 in FIG. 2, the second processor 540 in FIG. 5, the display driving circuit 640 in FIG. 6, and/or the display driving circuit 840 in FIG. 8) for controlling the driving of the display, and a main processor (e.g., the processor 120 in FIG. 1, the first processor 520 in FIG. 5, and/or the application processor 620 in FIG. 6), and the main processor may be configured to identify a view region on which image data is to be displayed in the display according to a change in the structure of the display, based on sensing information transmitted from the at least one sensor, determine a frame rate of the at least one display processor, based on a change of the view region, and drive the display at the determined frame rate.

According to various embodiments, the main processor is configured to configure a maximum resolution to correspond to a size corresponding to a maximum area of the display including the first region and the second region, and if the view region is changed to the maximum area, drive the at least one display processor at a minimum frame rate.

According to various embodiments, the main processor, if the view region is identified as the first region having a minimum area, drive the at least one display processor at a frame rate higher than the minimum frame rate.

wherein the display is configured such that the second region is accommodated inside the electronic device and is moved in one direction by sliding driving or rolling driving to then be exposed to the outside of the electronic device.

According to various embodiments, the main processor is configured to identify image data to be displayed on the display, control the at least one display processor to be driven at a first frame rate determined corresponding to the view region, determine whether or not an area of the view region of the display is changed, if the view region of the display is extended, control the display to be driven at a second frame rate lower than the first frame rate, and if the view region of the display is reduced, drive the display at a third frame rate higher than the first frame rate.

Figure 10:
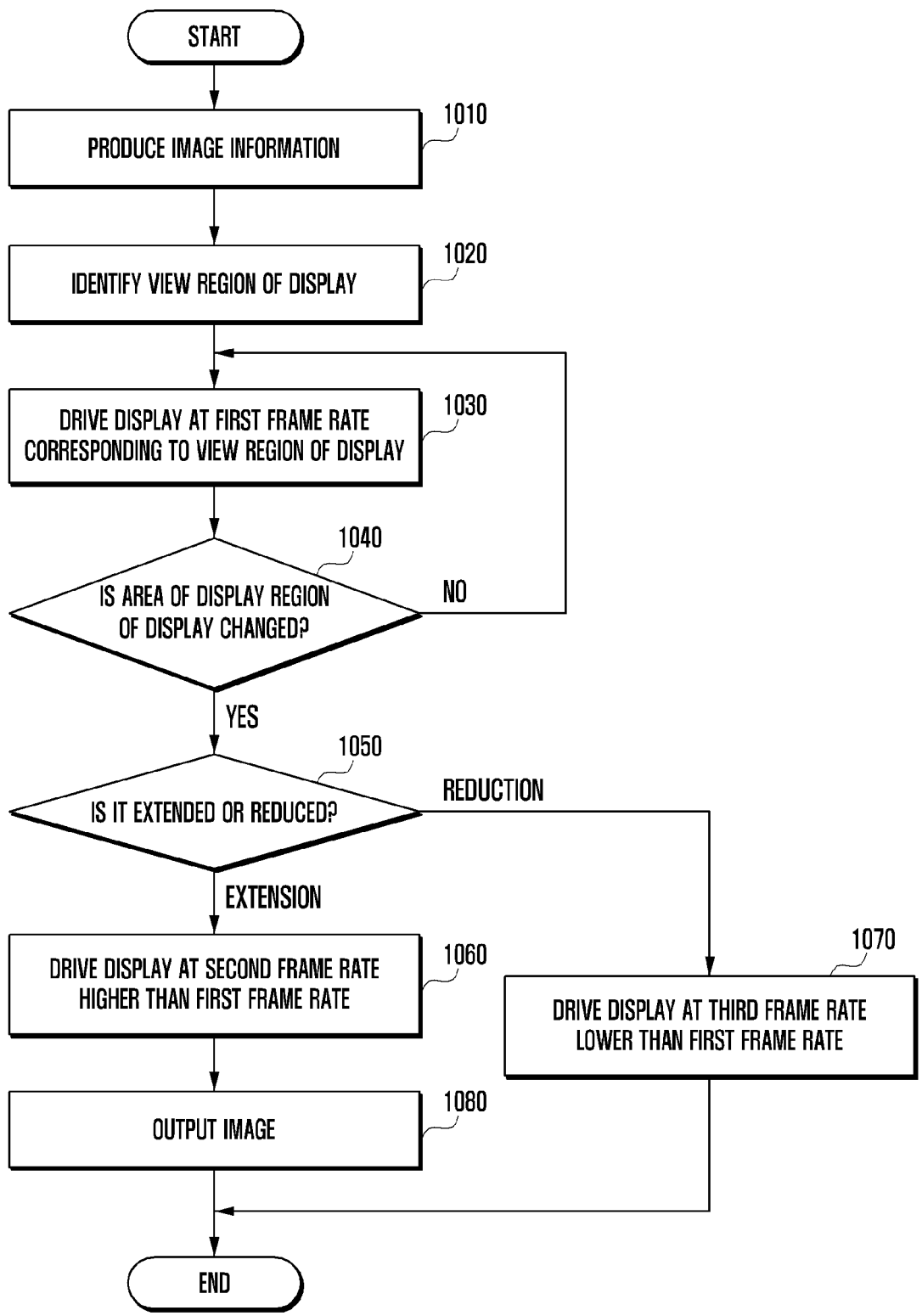
FIG. 10 illustrates a method of driving a display of an electronic device according to various embodiments.

FIG. 10 illustrates a method of driving a display of an electronic device according to various embodiments.

Referring to FIG. 10, a processor (e.g., the processor 120 in FIG. 1, the first processor 520 in FIG. 5, or the application processor 620 in FIG. 6) of an electronic device (e.g., the electronic device 101 in FIG. 1, the electronic device 301 in FIGS. 3A to 3C, the electronic device 401 in FIG. 4, the electronic device 501 in FIG. 5, or the electronic device 601 in FIG. 6) according to an embodiment may produce information on the image to be displayed on a display (e.g., the display device 160 in FIG. 1, the display 210 in FIG. 2, the display 312 in FIGS. 3A to 3C, the display 412 in FIG. 4, the display 510 in FIG. 5, or the display panel 610 in FIG. 6) according to a user request or a specified request in operation 1010.

In operation 1020, the processor may identify the display structure of the display, based on the sensing information, and may determine a first frame rate corresponding to the view region of the display. The processor may determine the first frame rate according to the area corresponding to the view region, based on the maximum resolution corresponding to the maximum area of the display including a hidden region and an open region.

In operation 1030, the processor may control the display to be driven at the determined first frame rate.

According to various embodiments, the processor may perform control such that the image data to be displayed on the display is stored in a buffer memory (e.g., the memory 233 in FIG. 2 or the buffer 560 in FIG. 5) of the display, and may transmit control information to the display processor (e.g., the display driver IC 230 in FIG. 2, the second processor 540 in FIG. 5, or the display driving circuit 640 in FIG. 6). The display processor may determine a driving current for driving a display pixel, based on the image data stored in the buffer memory, and may control the driving current for each pixel so as to display a screen on the display, based on the determined driving current.

In operation 1040, the processor may determine whether or not the area of the view region of the display is changed according to the change in the structure of the display. If the area of the view region of the display is changed, the processor may proceed to operation 1050, and if the area of the view region of the display is not changed, the processor may proceed to operation 1030, thereby maintaining the operation of the display driven at the first frame rate.

In operation 1050, the processor may determine whether the view region of the display is extended or reduced, and if the view region is extended, the processor may control the display to be driven at a second frame rate higher than the first frame rate in operation 1060. The processor may transmit information on the changed second frame rate to the display processor or the display driving circuit.

In operation 1070, if the view region of the display is reduced, the processor may control the display to be driven at a third frame rate lower than the first frame rate. The processor may transmit information on the changed third frame rate to the display processor or the display driving circuit.

In operation 1080, the processor may control driving of the display so as to display an image thereon.

Figure 11:
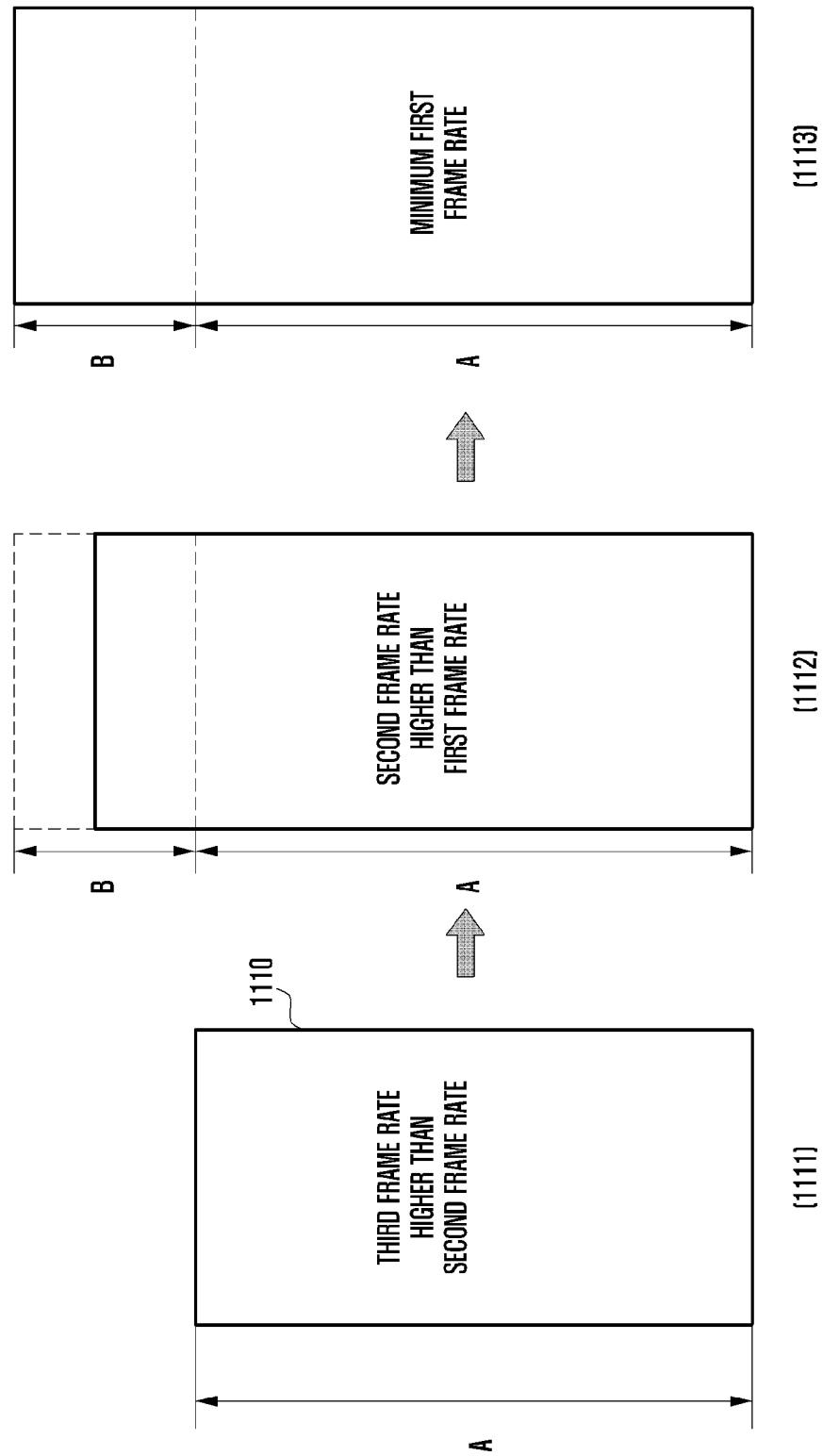
FIG. 11 is a diagram illustrating differences in the view region of a display depending on a change in the structure of a display according to various embodiments.

FIG. 11 is a diagram illustrating differences in the view region of a display depending on a change in the structure of a display according to various embodiments.

Referring to FIG. 11, an electronic device (e.g., the electronic device 101 in FIG. 1, the electronic device 301 in FIGS. 3A to 3C, the electronic device 401 in FIG. 4, the electronic device 501 in FIG. 5, or the electronic device 601 in FIG. 6) according to an embodiment may change a view region of a display 1110 (e.g., the display device 160 in FIG. 1, the display 210 in FIG. 2, the display 312 in FIGS. 3A to 3C, the display 412 in FIG. 4, the display 510 in FIG. 5, or the display panel 610 in FIG. 6) under the control of a user. A processor (e.g., the processor 120 in FIG. 1, the first processor 520 in FIG. 5, or the application processor 620 in FIG. 6) of the electronic device may perform control to change a frame rate frequency for driving a display driving circuit or a display processor (e.g., the display driver IC 230 in FIG. 2, the second processor 540 in FIG. 5, or the display driving circuit 640 in FIG. 6) that controls the display 1110 in response to the view region, which changes depending on a change in the display structure of the display 1110.

According to an embodiment, in the case of a structure 1113 in which the view region has the maximum display area including the open region A and the hidden region B, the electronic device may drive the display driving circuit 440 at a first frame rate frequency (e.g., 50 hz, 90 hz, etc.), which is the minimum frame rate frequency, thereby displaying image data on the display.

According to an embodiment, if the display area is reduced because at least a portion of the hidden region B is exposed to the outside as shown in 1112, since the area to be displayed is reduced, the electronic device may perform driving at a second frame rate frequency (e.g., 50 Hz→55 Hz or 90 Hz→110 hz), which is relatively higher than the first frame rate, thereby displaying image data on the display.

According to an embodiment, if the view region has the minimum area corresponding to the open region A as shown in structure 1111, since the area of the view region is reduced to less than 1112, the electronic device may perform driving at a third frame rate frequency (e.g., 55 Hz→60 Hz or 110 Hz→120 Hz), which is relatively higher than the second frame rate, thereby displaying an image on the display.

Figure 12:
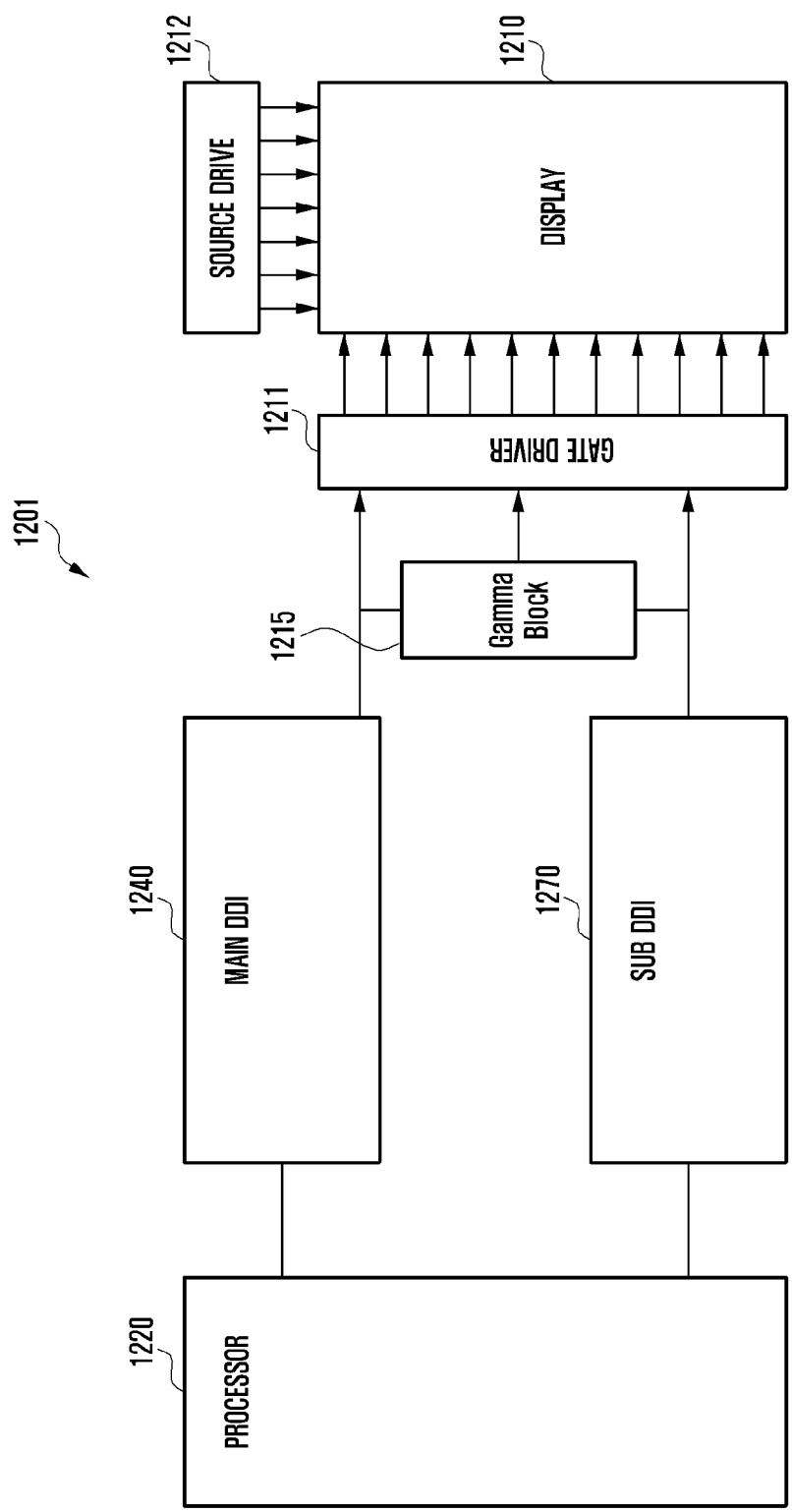
FIG. 12 is a block diagram of an electronic device according to another embodiment of the disclosure.
Figure 13:
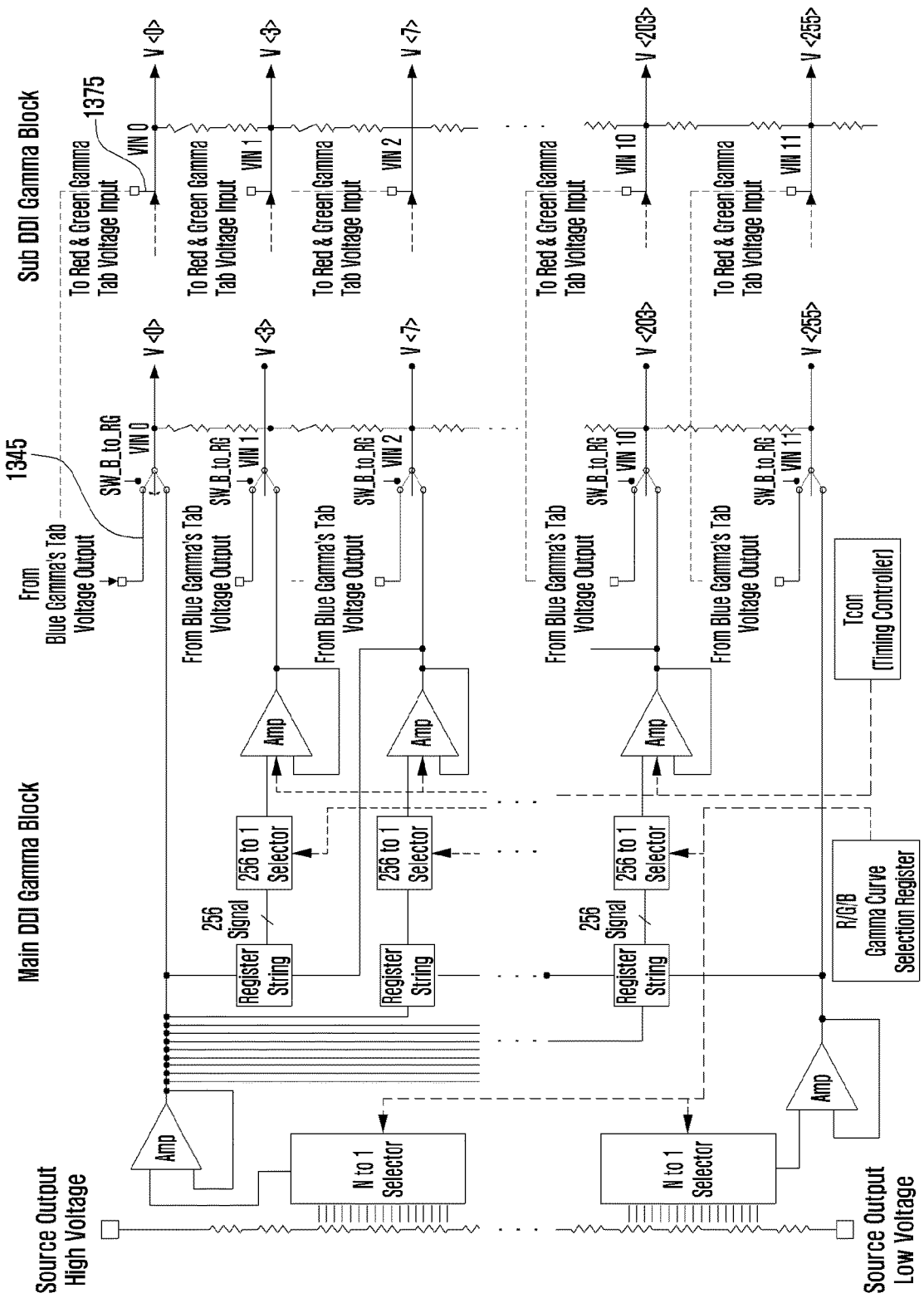
FIG. 13 is a diagram illustrating the configuration of a circuit of a display according to an embodiment of the disclosure.

FIG. 12 is a block diagram of an electronic device according to another embodiment of the disclosure, and FIG. 13 is a diagram illustrating the configuration of a circuit of a display according to an embodiment of the disclosure. Referring to FIG. 12, an electronic device 1201 (e.g., the electronic device 101 in FIG. 1, the electronic device 301 in FIGS. 3A to 3C, the electronic device 401 in FIG. 4, or the electronic device 501 in FIG. 5) according to an embodiment of the disclosure may include a display 1210 (e.g., the display device 160 in FIG. 1, the display 210 in FIG. 2, the display 312 in FIGS. 3A to 3C, the display 412 in FIG. 4, or the display 510 in FIG. 5), a main display driving circuit (main DDI) 1240 (e.g., the processor 120 in FIG. 1 or the first processor 520 in FIG. 5), a sub-display driving circuit (sub DDI) 1270 (e.g., the display driver IC 230 in FIG. 2 or the second processor 540 in FIG. 5), and a processor 1220 (e.g., the processor 120 in FIG. 1 or the first processor 520 in FIG. 5).

According to an embodiment, the display 1210 may include an open region (e.g., the open region A in FIG. 9), which is always exposed on the front surface of the electronic device 1201, and a hidden region (e.g., the hidden region B in FIG. 9), which is accommodated inside the electronic device 1201 and is exposed on the front surface or hidden therein depending on the display structure of the display 1210. The display 1210 may display image data under the control of at least part of the main display driving circuit (main DDI) 1240 and the sub-display driving circuit (sub DDI) 1270.

According to an embodiment, the main display driving circuit (main DDI) 1240 may be an integrated circuit for driving the display 1210. The main display driving circuit (main DDI) 1240 may supply image data received from the processor 1220 to the display 1210 at a predetermined number of frames. The main display driving circuit (main DDI) 1240 may include a graphic buffer (not shown). The main display driving circuit (main DDI) 1240 may perform control such that some of image data is output to a specified view region of the display 1210. The display driving circuit (DDI) 1240 may convert the image data stored in the graphic buffer into an image signal, and may supply the same to a source driver 1212 and a gate driver 1211.

According to an embodiment, the sub-display driving circuit (sub DDI) 1270 may be an integrated circuit for driving at least part of the display 1210. The sub-display driving circuit (sub DDI) 1270 may supply the image data received from the processor 1220 to the display 1210 at a predetermined number of frames. The sub-display driving circuit (sub DDI) 1270 may include a graphic buffer (not shown). The sub-display driving circuit (sub DDI) 1270 may perform control such that some of image data is output to a specified view region of the display 1210. The sub-display driving circuit (sub DDI) 1270 may convert the image data stored in the graphic buffer into image signals, and may supply the same to the source driver 1212 or the gate driver 1211.

According to an embodiment, the processor 1220 may accumulate a total time during which an image is displayed on the display 1210, may calculate a cumulative time during which the hidden region of the display 1210 is exposed and a cumulative time during which the hidden region is not exposed, based on sensing information, and may subtract the cumulative time during which the hidden region is not exposed from the cumulative time during which the hidden region is exposed, thereby calculating the difference in time of the hidden region. The processor 1220 may perform calculation by subtracting the difference in time of the hidden region from the total cumulative time, and may adjust data to be displayed on the hidden region and data to be displayed on the open region depending on the gap of a usage time.

According to an embodiment, the processor 1220 may calculate the difference in the resolution between the open region and the hidden region, and may adjust output data to be displayed on the hidden region and output data to be displayed on the open region in consideration of the difference in the load of data processed to output image data.

According to an embodiment, the processor 1220 may identify the view region on which an image is to be displayed depending on the display structure, based on sensing information, and may determine whether or not to drive the sub-display driving circuit 1270 depending on whether or not the hidden region is exposed. The processor 1220 may control only the main display driving circuit (e.g., the main DDI) 1240 to be driven in the display structure in which only the open region is exposed to display an image, and may control the main display driving circuit 1240 or the sub-display driving circuit 1270 to be driven in the display structure in which the hidden region is exposed to the outside of the electronic device.

According to an embodiment, the processor 1220 may control the main display driving circuit 1240 to be driven to display an image on the open region of the entire area of the display, and may control the-sub display driving circuit 1270 to be driven to display an image on the hidden region thereof.

According to an embodiment, the processor 1220 may divide image data to be displayed on the display 1210 into the data for the open region and the data for the hidden region, may adjust the image data by calculating the difference in the area between the open region and the exposed hidden region, and may transmit the image data to be displayed on the open region to the main display driving circuit and transmit the image data to be displayed on the hidden region to the sub-display driving circuit, based on the adjusted image data.

According to an embodiment, the processor 1220 may perform control for adjustment by sharing a gamma voltage between the main display driving circuit 1240 and the sub-display driving circuit 1270 in order to prevent a difference in color at the boundary line between the open region and the hidden region.

According to an embodiment, the electronic device 1201 may further include a gamma block 1215 for suppressing the difference in color according to the arrangement structure of the main display driving circuit 1240 and the sub-display driving circuit 1270. For example, the gamma block 1215 may be configured to adjust linearity of transmittance for each gray scale in consideration of visual characteristics, and may be a circuit for providing voltage compensation for gamma adjustment.

According to an embodiment, the gamma block 1215 may be connected to the source driver 1211 of the display 1210, and may be connected to the main display driving circuit 1240 and the sub-display driving circuit 1270. A gamma tap voltage regulation circuit in the main display driving circuit 1240 may be electrically connected to a gamma tap voltage regulation circuit in the sub-display driving circuit 1270 so that the main display driving circuit 1240 and the sub-display driving circuit 1270 may share the gamma voltage. For example, as shown in FIG. 13, a tap voltage output line 1345 of the main display driving circuit 1240 may be connected to a tap voltage output line 1375 of the sub-display driving circuit 1270 as denoted by the dotted line, thereby controlling the source output voltage of the main display driving circuit 1240 and the source output voltage of the sub-display driving circuit 1270 to be the same.

Figure 14:
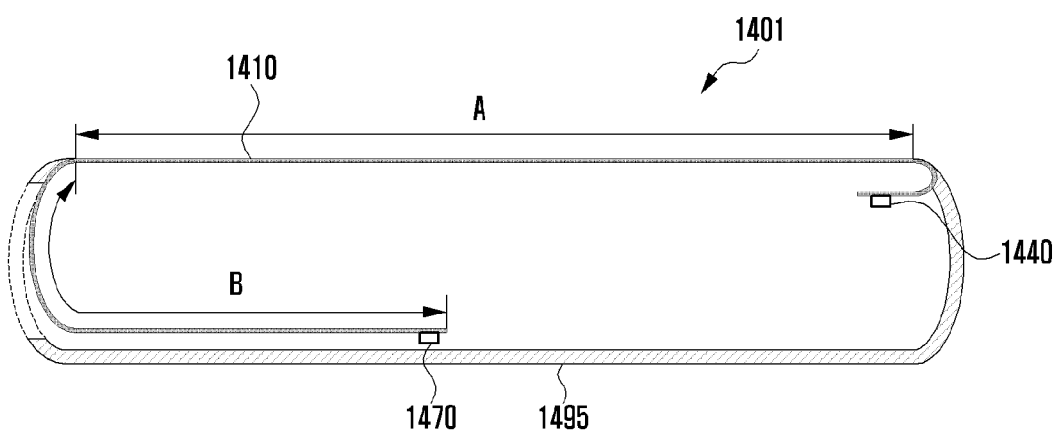
FIG. 14 is a diagram schematically illustrating the cross-section of a display of an electronic device according to various embodiments.

FIG. 14 is a diagram schematically illustrating the cross-section of a display of an electronic device according to various embodiments. Referring to FIG. 14, an electronic device 1401 (e.g., the electronic device 101 in FIG. 1, the electronic device 301 in FIGS. 3A to 3C, the electronic device 401 in FIG. 4, the electronic device 501 in FIG. 5, or the electronic device 1201 in FIG. 12) having a display capable of rolling according to various embodiments may be configured to include a housing 1495 to which at least some or all of the configurations shown in FIG. 1, FIG. 2, FIGS. 3A to 3C, FIG. 4, FIG. 5, and/or FIG. 12 are mounted. The housing 1495 may be implemented such that at least a portion of the display 1410 is exposed in a first size (e.g., the open region A in FIG. 9) on the front surface of the electronic device and such that the remaining part (e.g., the hidden region B in FIG. 9) is accommodated inside the housing 1495.

For convenience of description, other elements mounted inside the housing 1495, except a display 1410 (e.g., the display device 160 in FIG. 1, the display 210 in FIG. 2, the display 312 in FIGS. 3A to 3C, the display 412 in FIG. 4, the display 510 in FIG. 5, or the display 1210 in FIG. 12), a first display driving circuit 1440 (e.g., the second processor 540 in FIG. 5 or the main DDI 1240 in FIG. 12), and a second display driving circuit 1470 (e.g., the third processor 570 in FIG. 5 or the sub DDI 1270 in FIG. 12), have been omitted from the drawing.

According to an embodiment, a main display driving circuit (e.g., main DDI) 1440 for controlling the display 1410 in at least a portion of the display 1410 may be disposed at the end of one side of the open region A of the display 1410. A sub-display driving circuit (sub DDI) 1470 for controlling the display 1410 may be disposed at the end of the opposite side of the hidden region B of the display.

According to an embodiment, the main display driving circuit (e.g., main DDI) 1440 may be driven to display an image on the open region A, and the sub-display driving circuit (sub DDI) 1470 may be driven to display an image on the hidden region B. The sub-display driving circuit (sub DDI) 1470 may be activated under the control of an application processor or a main processor (e.g., the processor 120 in FIG. 1, the first processor 520 in FIG. 5, or the processor 1220 in FIG. 12) if the hidden region B is exposed to the outside.

Figure 15:
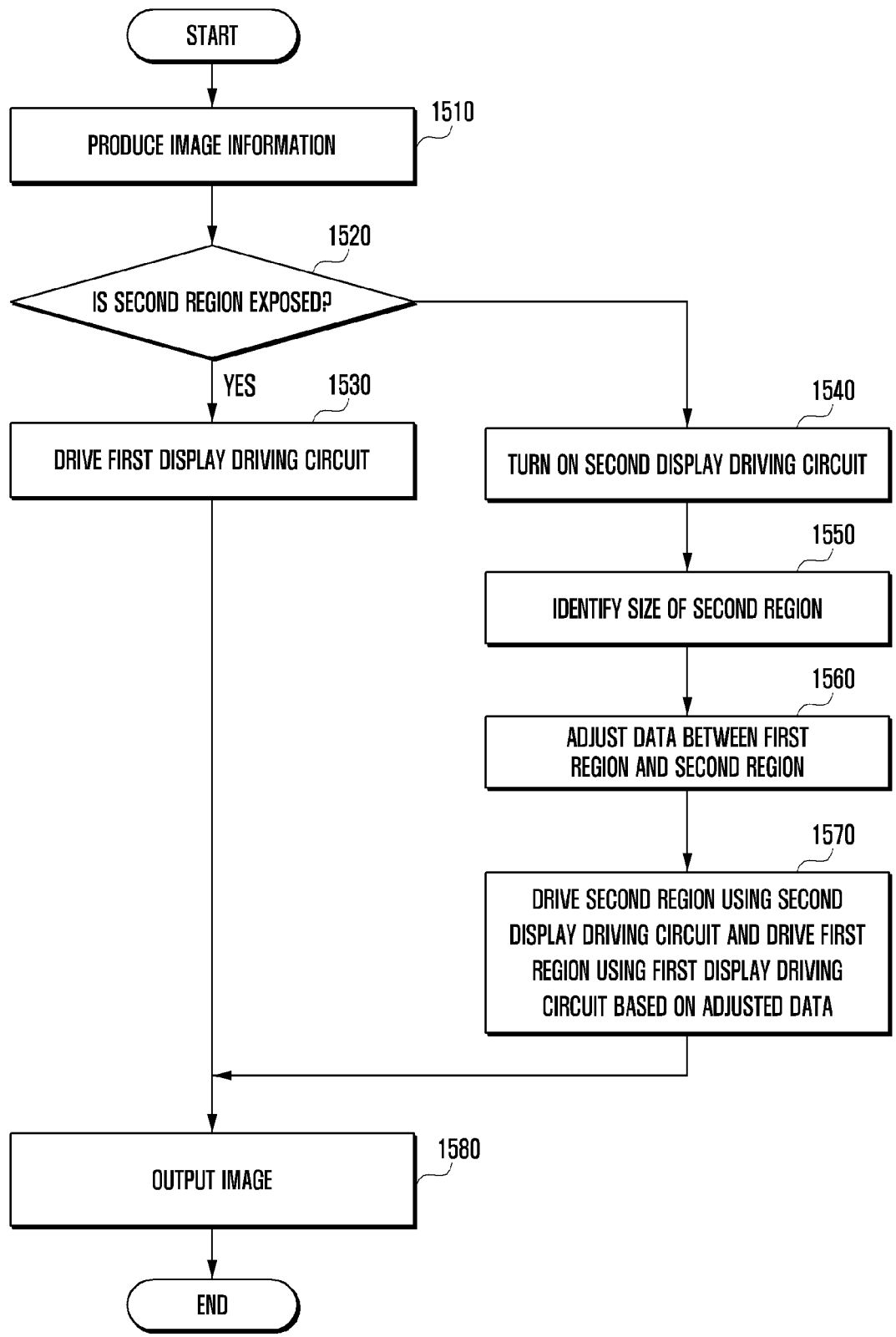
FIG. 15 illustrates a method of driving a display of an electronic device according to various embodiments.

FIG. 15 illustrates a method of driving a display of an electronic device according to various embodiments.

Referring to FIG. 15, a processor (e.g., the processor 120 in FIG. 1, the first processor 520 in FIG. 5, or the processor 1220 in FIG. 12) of an electronic device (e.g., the electronic device 101 in FIG. 1, the electronic device 301 in FIGS. 3A to 3C, the electronic device 401 in FIG. 4, the electronic device 501 in FIG. 5, or the electronic device 1201 in FIG. 12) according to an embodiment may produce information on an image to be displayed on a display in operation 1510.

In operation 1520, the processor may identify the display structure of a display (e.g., the display device 160 in FIG. 1, the display 210 in FIG. 2, the display 312 in FIGS. 3A to 3C, the display 412 in FIG. 4, the display 510 in FIG. 5, or the display 1210 in FIG. 12) based on sensing information, and may determine whether or not a second region of a view region of the display, for example, a hidden region (e.g., the hidden region B in FIG. 9), which is accommodated inside the electronic device, is exposed to the outside of the electronic device.

In operation 1540, if the second region is exposed, the processor may turn on a second display driving circuit (e.g., the third processor 370 in FIG. 3 or the sub DDI 1070 in FIG. 10).

In operation 1550, the processor may identify the area of the view region of the display, which changes depending on the exposure of the second region.

In operation 1560, the processor may adjust image data by calculating the difference in area between a first region and the exposed second region. For example, the processor may adjust the image data, which is to be displayed on the display, to first image data to be displayed on the first region and second image data to be displayed on the second region, based on the result of calculating the difference in the area.

For example, the processor may accumulate a total time during which an image is displayed on the display, may calculate a cumulative time during which the hidden region of the display is exposed and a cumulative time during which the hidden region is not exposed based on sensing information, and may subtract the cumulative time during which the hidden region is not exposed from the cumulative time during which the hidden region is exposed, thereby calculating the difference in time of the hidden region. The processor may perform calculation by subtracting the difference in time of the hidden region from the total cumulative time, and may adjust first image data to be displayed on the hidden region and second image data to be displayed on the open region according to the gap of a usage time.

As another example, the processor may calculate the difference in the resolution between the open region and the hidden region, and may adjust first image data to be displayed on the hidden region and second image data to be displayed on the open region in consideration of the difference in the load of data processed to output the image data.

In operation 1570, the processor may perform control such that the first region is driven through the first display driving circuit, and the second region (hidden region) is driven through the second display driving circuit. The processor may transmit the first image data to the first display driving circuit, and may transmit the second image data to the second display driving circuit.

In 1580, the processor may control driving of the display so as to display an image on the display.

Figure 16:
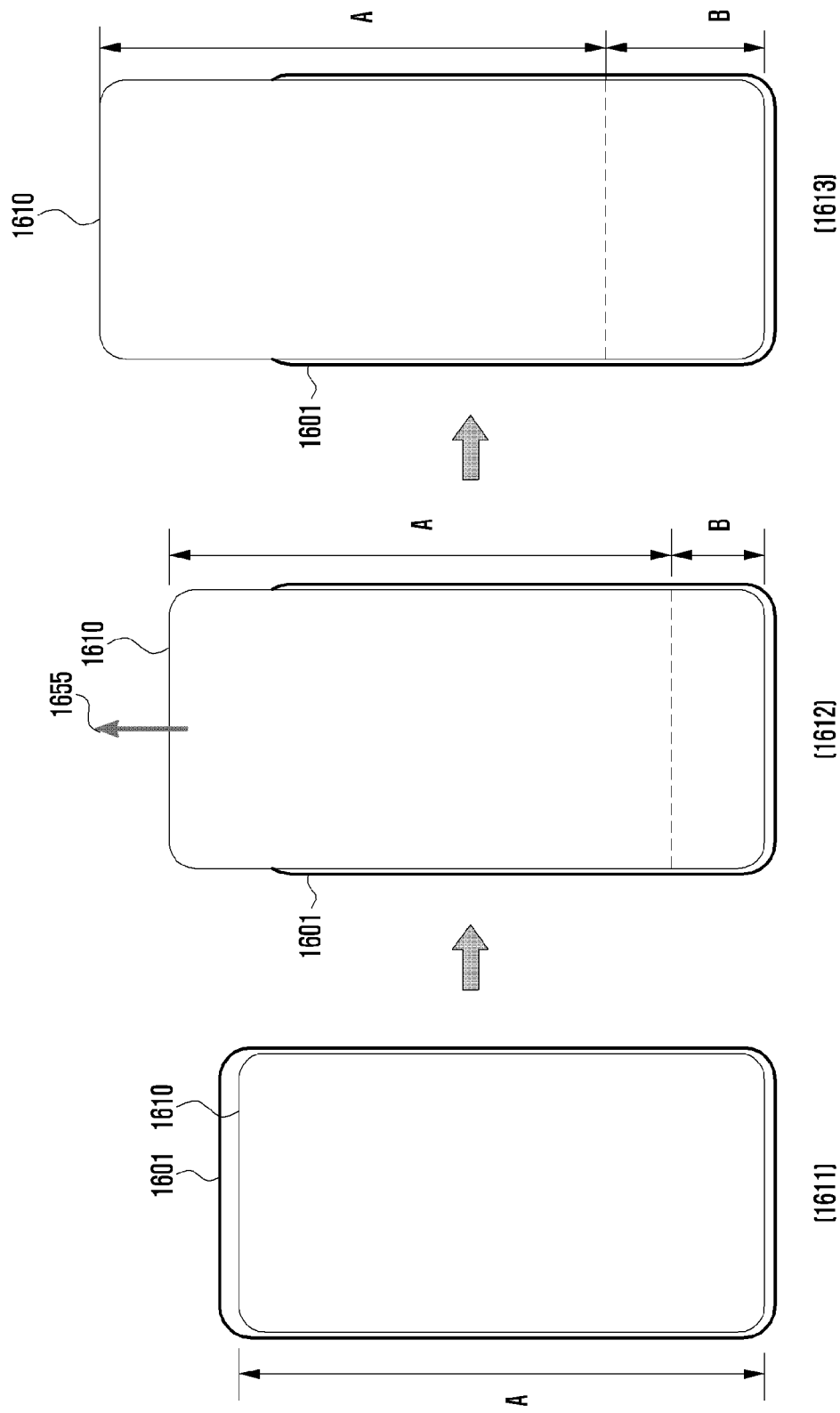
FIG. 16 is a diagram illustrating an example of the relationship between a change in the structure of a display and a display driving circuit in an electronic device according to various embodiments.

FIG. 16 is a diagram illustrating an example of the relationship between a change in the structure of a display and a display driving circuit in an electronic device according to various embodiments.

Referring to FIG. 16, an electronic device 1601 according to an embodiment may have a display 1610 of which the display area changes under the control of a user, and a display driving circuit (or a display processor) may change in response to the changed display area. The electronic device may include a display 1610 including an open region A, which is always exposed on the front surface of the electronic device, and a hidden region B, which is accommodated inside the electronic device 1601 and is exposed on the front surface thereof or hidden therein depending on the display structure of the display.

As shown in 1611, the electronic device 1601 (e.g., the electronic device 101 in FIG. 1, the electronic device 301 in FIGS. 3A to 3C, the electronic device 401 in FIG. 4, the electronic device 501 in FIG. 5, or the electronic device 1201 in FIG. 12) may have a structure in which the hidden region B of the display 1610 (e.g., the display device 160 in FIG. 1, the display 210 in FIG. 2, the display 312 in FIGS. 3A to 3C, the display 412 in FIG. 4, the display 510 in FIG. 5, or the display 1210 in FIG. 12) is accommodated inside the electronic device 1601 so that at least a portion of the display 1610 may be exposed.

Referring to 1611, since only the area of the open region A corresponds to the view region in the display structure of the display 1610 in which only the open region A is exposed, only the main display driving circuit (e.g., the second processor 540 in FIG. 5 or the main DDI 1240 in FIG. 12) may be driven to display image data.

Referring to 1612, in the electronic device 1601 in which the display 1610 is extended, the hidden region B of the display 1610 accommodated therein may be gradually moved in the direction toward the upper side 1655, and may then be exposed to the outside of the electronic device 1601.

Referring to 1613, the display 1610 may have the maximum area, including the open region A and the hidden region B, exposed to the outside thereof.

In the display structure shown in 1613, the view region corresponding to the open region A may display image data through the main display driving circuit, and the view region corresponding to the hidden region B may display image data through the sub-display driving circuit (e.g., the third processor 570 in FIG. 5 or the sub DDI 1270 in FIG. 12). According to an embodiment, the main display driving circuit may be disposed at one end of the open region A, and the sub-display driving circuit may be disposed at one end of the hidden region B.

According to an embodiment, the electronic device 1601 may adjust the data to be displayed on the hidden region B and the data to be displayed on the open region A according to the gap of a usage time, based on the difference in time of the hidden region B, which is calculated by subtraction of the total time during which an image is displayed, the cumulative time during which the hidden region B is exposed, and the cumulative time during which the hidden region B is not exposed.

According to an embodiment, the electronic device 1601 may calculate the difference in the resolution between the open region A and the hidden region B, and may adjust the output data to be displayed on the hidden region B and the output data to be displayed on the open region A in consideration of the difference in the load of data processed to output image data.

According to an embodiment, the electronic device 1601 may perform control for adjustment by sharing a gamma voltage between the main display driving circuit and the sub-display driving circuit in order to prevent a difference in color at the boundary line between the open region A and the hidden region B.

According to an embodiment, the electronic device 1601 may adjust the data to be displayed on the hidden region B and the data to be displayed on the open region A or the gamma voltage, thereby preventing the boundary line between the hidden region B and the open region A from being visually revealed depending on the arrangement structure of the main display driving circuit and the sub-display driving circuit.

Figure 17:
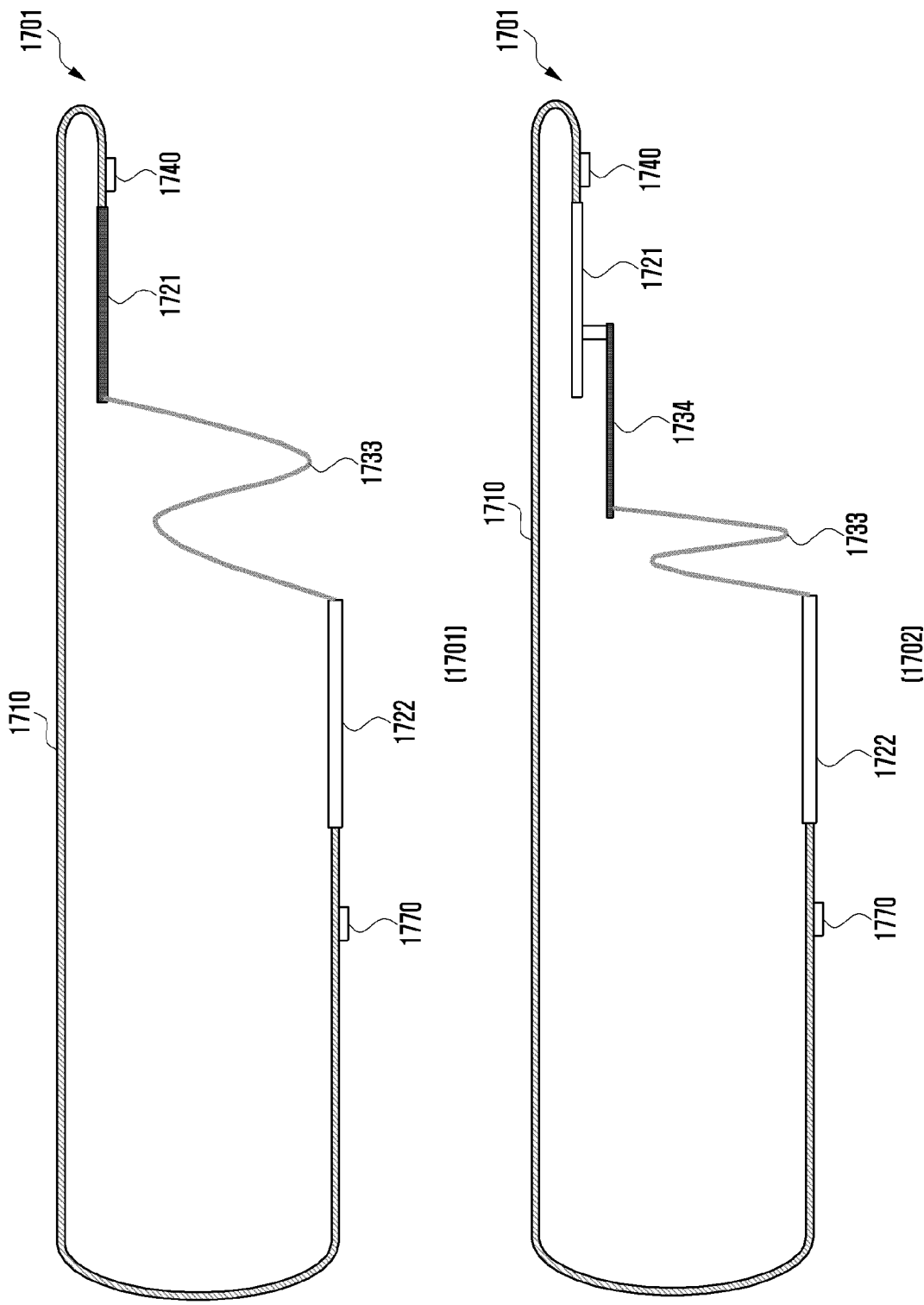
FIGS. 17, 18 and 19 illustrate examples of connections of a dual display driving circuit of an electronic device according to various embodiments.
Figure 18:
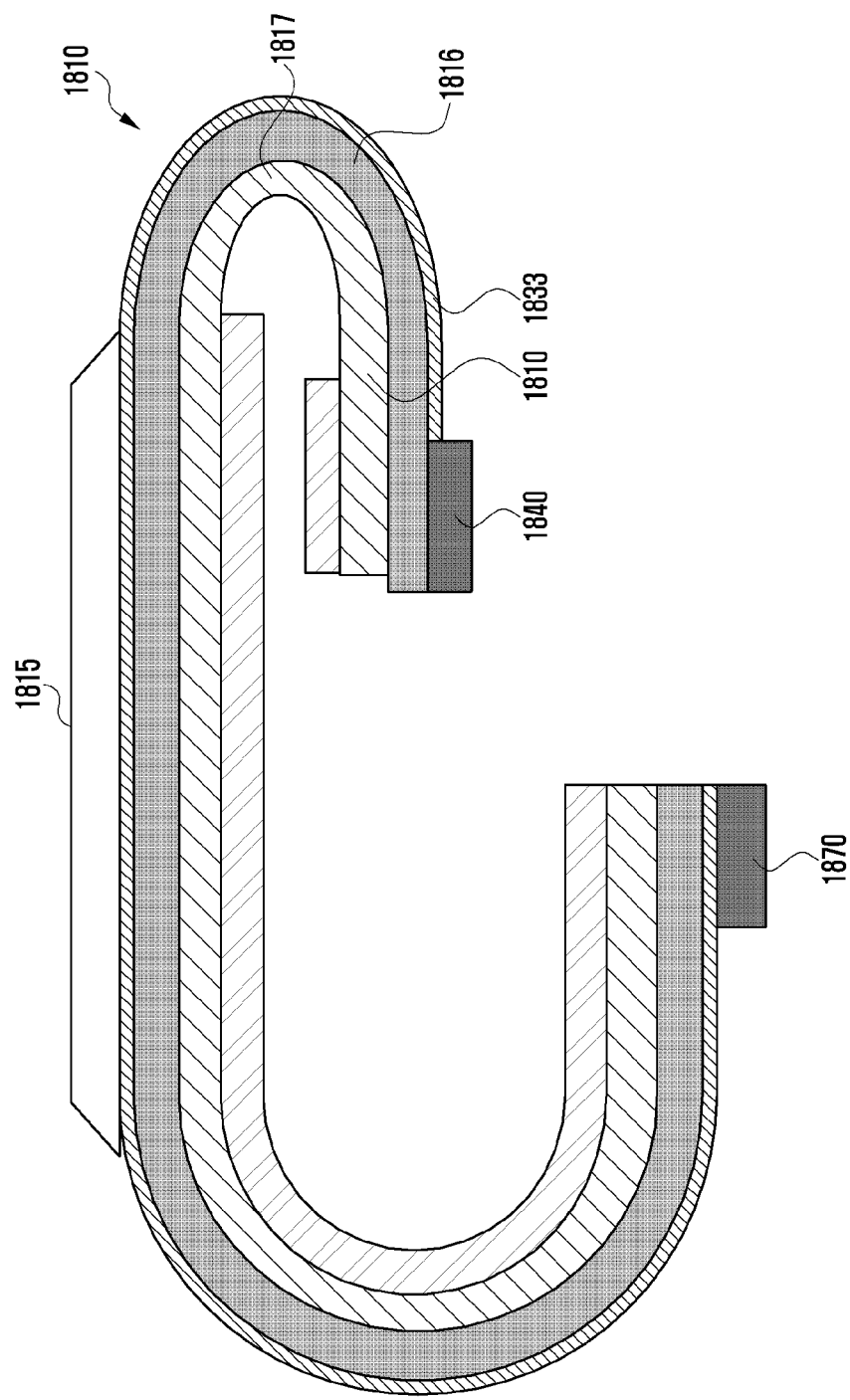
Figure 19:
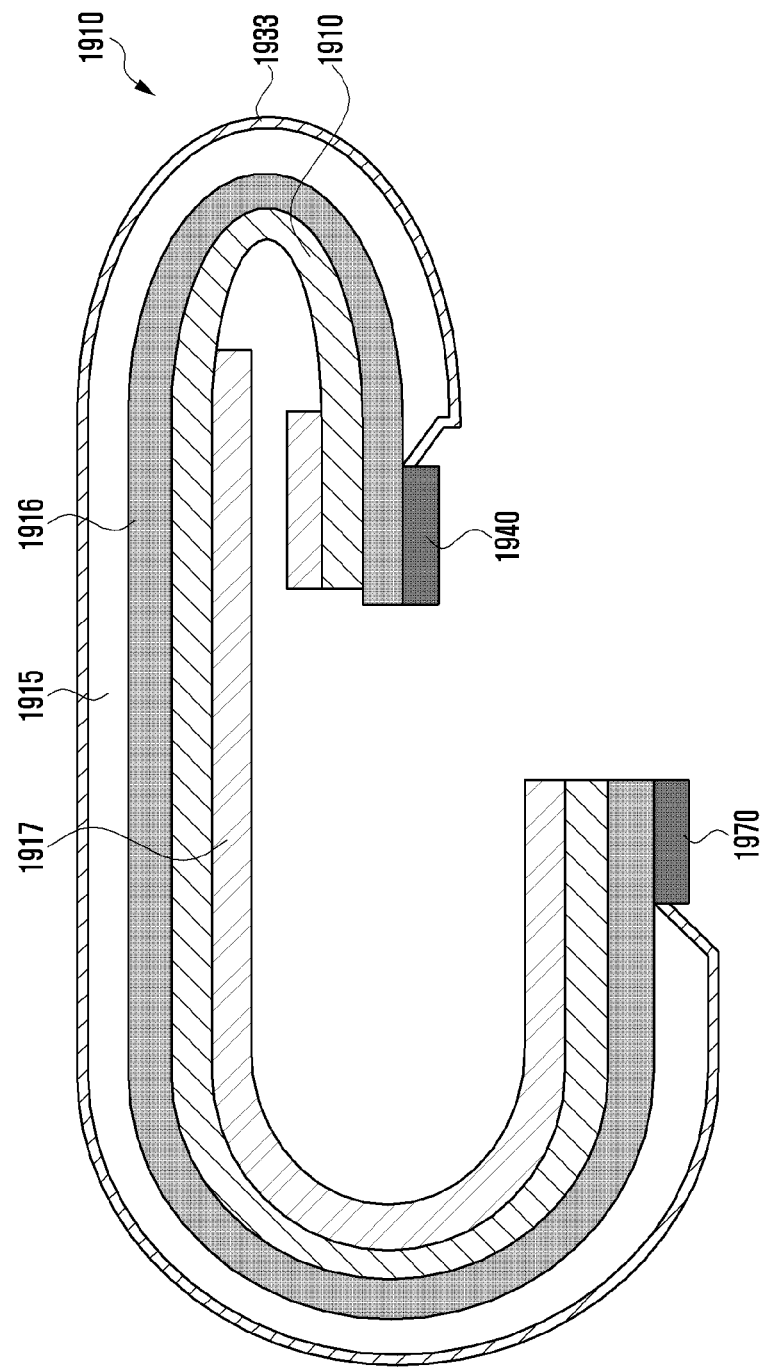

FIGS. 17 to 19 illustrate examples of connections of a dual display driving circuit of an electronic device according to various embodiments.

According to various embodiments, in order to prevent the difference in color at the boundary line between an open region (e.g., the open region A in FIG. 9) and a hidden region (e.g., the hidden region B in FIG. 9) of a display 1710 (e.g., the display device 160 in FIG. 1, the display 210 in FIG. 2, the display 312 in FIGS. 3A to 3C, the display 412 in FIG. 4, the display 510 in FIG. 5, or the display 1210 in FIG. 12), an electronic device 1701 (e.g., the electronic device 101 in FIG. 1, the electronic device 301 in FIGS. 3A to 3C, the electronic device 401 in FIG. 4, the electronic device 501 in FIG. 5, or the electronic device 1201 in FIG. 12) may be implemented to share a gamma voltage between a main display driving circuit (or a main display processor) (e.g., the second processor 540 in FIG. 5 or the main DDI 1240 in FIG. 12) and a sub-display driving circuit (or a sub-display processor) (e.g., the third processor 570 in FIG. 5 or the sub DDI 1270 in FIG. 12), thereby controlling the source output voltage of the main display driving circuit and a source output voltage of the sub-display driving circuit to be the same.

According to some embodiments, as shown in FIG. 17, the electronic device 1701 may have a main display driving circuit 1740 disposed at the end of one side of the display 1710 and a sub-display driving circuit 1770 disposed at the end of the opposite side of the display 1710. In order to electrically connect a gamma tap voltage regulation circuit in the main display driving circuit 1740 to a gamma tap voltage regulation circuit in the sub-display driving circuit 1770, the main display driving circuit 1740 may be connected to a first flexible PCB substrate 1721, and the sub-display driving circuit 1770 may be connected to a second flexible PCB substrate 1722. The first flexible PCB substrate 1721 and the second flexible PCB substrate 1722 may be connected through a connecting member 1733, thereby adjusting the gamma voltage of the main display driving circuit 1740 and the sub-display driving circuit 1770.

According to some embodiments, as shown in FIG. 17, the electronic device 1701 may have the main display driving circuit 1740 and the sub-display driving circuit 1770, which are disposed at both ends of the display. In the structure for regulating the gamma tap voltage regulation circuit in the main display driving circuit 1740 and the gamma tap voltage regulation circuit in the sub-display driving circuit 1770, the first flexible PCB substrate 1721 may be connected to the main display driving circuit 1740, and the first flexible PCB substrate 1721 may be connected to an FCB substrate 1734. The sub-display driving circuit 1770 may be connected to the second flexible PCB substrate 1722, and the second flexible PCB substrate 1722 may be connected to the FCB substrate 1734 through the connecting member 1733.

Some embodiments, as shown in FIGS. 18 and 19, may be implemented to share the gamma voltage using some of the display lines, in addition to the wiring connection through the PCB substrate.

According to an embodiment, the display 1810, as shown in FIG. 18, may have a structure in which the thin-film transistor (TFT) layer 1816 and a panel layer 1817 are stacked, and a thin-film encapsulation (TFE) layer 1815 on the TFT layer 1816 may be further included. In the display 1810 in FIG. 18, a wiring line 1833 may electrically connect a gamma tap voltage regulation circuit in a main display driving circuit 1840 to a gamma tap voltage regulation circuit in a sub-display driving circuit 1870 through a non-driving part {black matrix (BM)} at the edge of the TFT layer 1816.

According to some embodiments, the display 1910, as shown in FIG. 19, may have a structure in which a thin-film transistor (TFT) layer 1916 and a panel layer 1917 are stacked, and a thin-film encapsulation (TFE) layer 1915 on the TFT layer 1916 may be further included. In the display 1910 in FIG. 19, a wiring line 1933 may electrically connect a gamma tap voltage regulation circuit in a main display driving circuit 1940 to a gamma tap voltage regulation circuit in a sub-display driving circuit 1970 through a line on the thin-film encapsulation (TFE) layer other than the TFT layer 1916.

An electronic device (e.g., the electronic device 101 in FIG. 1, the electronic device 301 in FIGS. 3A to 3C, the electronic device 401 in FIG. 4, the electronic device 501 in FIG. 5, the electronic device 1201 in FIG. 12, the electronic device 1401 in FIG. 14, the electronic device 1601 in FIG. 16, the electronic device 1701 in FIG. 17, the electronic device 1801 in FIG. 18, and/or the electronic device 1901 in FIG. 19) according to various embodiments may include: a display (e.g., the display device 160 in FIG. 1, the display 210 in FIG. 2, the display 312 in FIGS. 3A to 3C, the display 412 in FIG. 4, the display 510 in FIG. 5, the display 1210 in FIG. 12, the display 1410 in FIG. 14, the display 1601 in FIG. 16, the display 1710 in FIG. 17, the display 1810 in FIG. 18, and/or the display 1910 in FIG. 19) including a first region (e.g., the open region A) exposed on the front surface of the electronic device and a second region (e.g., the hidden region B) accommodated inside the electronic device or exposed to the outside of the electronic device; at least one sensor (e.g., the sensor module 176 in FIG. 1, the sensor modules 314 and 334 in FIGS. 3A to 3C, or the sensor hub 550 in FIG. 5) configured to detect a change in the display structure of the display; at least one display processor (e.g., the display driver IC 230 in FIG. 2, the second and third processors 540 and 570 in FIG. 5, the main processor 1240 in FIG. 12, and/or the sub-processor 1270 in FIG. 12) configured to control driving of the display; and a main processor (e.g., the processor 120 in FIG. 1, the first processor 520 in FIG. 5, and/or the processor 1220 in FIG. 12), wherein the main processor may be configured to, based on sensing information transmitted from the at least one sensor, identify a view region on which image data is to be displayed in the display according to the change in the structure of the display, determine a frame rate of the at least one display processor, based on a change in the view region, and drive the display at the determined frame rate, and the at least one display processor may further include a first display processor (e.g., the second processor 540 in FIG. 5, the main DDI 1240 in FIG. 12, the main DD1 1440 in FIG. 14, the main DD1 1740 in FIG. 17, the main DD1 1840 in FIG. 18, and/or the main DD1 1940 in FIG. 19) and a second display processor (e.g., the third processor 570 in FIG. 5, the sub DDI 1270 in FIG. 12, the sub DD1 1470 in FIG. 14, the sub DD1 1770 in FIG. 17, the sub DD1 1870 in FIG. 18, and/or the sub DD1 1970 in FIG. 19), wherein the main processor may be configured to determine whether or not to activate the second display processor, based on the change in the view region.

According to some embodiments, the main processor, if the view region is changed to include the second region, activate the second display processor and process at least some of the image data to be displayed on the second region using the second display processor.

According to some embodiments the main processor is configured to drive the first region using the first display processor and drive the second region using the second display processor.

According to some embodiments wherein the main processor is configured to determine whether or not the second region accommodated inside the electronic device is exposed to the outside of the electronic device using the sensing information, activate the second display processor, based on a condition in which the second region is exposed to the outside of the electronic device, divide the image data to be displayed on the display into data corresponding to the area of the first region and data corresponding to the area of the second region according to the exposed area of the exposed second region, and based on the divided image data, drive the first region using the first display processor and drive the second region using the second display processor.

According to some embodiments, the main processor is configured to, if the second region is not exposed to the outside of the electronic device, deactivate the second display processor and drive the first region using the first display processor.

According to some embodiments, the main processor is configured to calculate a difference in a display area between the first region and the second region after dividing the image data to be displayed on the display into the first region and the second region, and adjust the image data.

According to some embodiments, the main processor is configured to accumulate a total time during which the image data is displayed on the display, calculate a cumulative time during which the second region of the display is exposed to the outside and a cumulative time during which the second region is not exposed to the outside, based on the sensing information, calculate a difference in cumulative time of the second region by subtracting the cumulative time during which the second region is not exposed from the cumulative time during which the second region is exposed, and subtract the difference in time of the second region from the total cumulative time, thereby adjusting the image data to be displayed on the second region and the image data to be displayed on the first region.

According to some embodiments, the main processor is configured to calculate a difference between the resolution corresponding to a size of the first region and the resolution corresponding to a size of the second region, and adjust output data to be displayed on the first region and output data to be displayed on the second region, based on a difference value of the load of data to be processed to output the image data.

According to some embodiments, the first display processor and the second display processor further comprise first and second gamma blocks electrically connected to a source driver of the display.

According to some embodiments the main processor is configured to control a source output voltage provided to the source driver to be the same by electrically connecting the first and second gamma blocks According to some embodiments, the first and second gamma blocks have a line formed therein to electrically connect a gamma tap voltage regulation circuit of the first display processor to a gamma tap voltage regulation circuit of the second display processor.

According to some embodiments, wherein a line electrically connecting the first display processor and the second display processor is formed along a non-driving portion (BM; black matrix) of edges in the display.

According to some embodiments, wherein a line is formed along an upper line of a thin-film encapsulation (TFE) layer constituting the display.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
a display comprising a first region exposed on a front surface of the electronic device and a second region accommodated inside the electronic device in a hidden position and exposed to an outside of the electronic device in an exposed position;
at least one sensor configured to detect a change in a display structure of the display;
at least one display processor configured to control driving of the display; and
a main processor,
wherein the main processor is configured to:
in response to a determination that the second region is in the hidden position and a view region on which image data is to be displayed is identified as the first region, drive the display at a first frame rate on a basis of a resolution corresponding to a size of the first region and the second region;
display image data on the first region of the display;
identify, when the second region changes from being in the hidden position to being in the exposed position according to the change in the structure of the display, a size of the view region;
in response to a determination that the view region is changed to include the first region and at least a part of the second region, drive the display at a second frame rate lower than the first frame rate on the basis of the resolution; and
display image data on the first region and the at least a part of the second region.

2. The electronic device of claim 1, wherein the main processor is further configured to:
in response to a determination that the view region is change to include the first region and an entirety of the second region, drive the display at a third frame rate lower than the second frame rate, and
wherein the first frame rate is a maximum frame rate according to a performance of the display and the third frame rate is a minimum frame rate according to the performance of the display.

3. The electronic device of claim 1, wherein the display is configured such that the second region is accommodated inside the electronic device and is moved in one direction by sliding driving or rolling driving to then be exposed to the outside of the electronic device.

4. The electronic device of claim 1, wherein the main processor is further configured to:
identify image data to be displayed on the display;
control the display to be driven at the first frame rate; and
determine whether or not an area of the view region of the display is changed.

5. The electronic device of claim 1, wherein the at least one display processor further comprises a first display processor and a second display processor, and
wherein the main processor is configured to:
if the view region is changed to include the second region, activate the second display processor; and
process at least some of the image data to be displayed on the second region using the second display processor.

6. The electronic device of claim 5, wherein the main processor is configured to:
activate the second display processor, based on a condition in which the second region is in the exposed position;
divide the image data to into first data corresponding to the first region and second data corresponding to the second region according to the exposed area of the exposed second region; and
based on the divided image data, display the first data by driving the first region using the first display processor and drive the second region using the second display processor.

7. The electronic device of claim 6, wherein the main processor is configured to:
if the second region is not exposed to the outside of the electronic device, deactivate the second display processor and drive the first region using the first display processor; and
if the second region is exposed to the outside of the electronic device, drive the first region using the first display processor and drive the second region using the second display processor.

8. The electronic device of claim 6, wherein the main processor is configured to;
calculate a difference in a display area between the first region and the second region after dividing the image data to be displayed on the display into the first region and the second region; and
adjust the image data.

9. The electronic device of claim 8, wherein the main processor is configured to:
- accumulate a total time during which the image data is displayed on the display;
- calculate a cumulative time during which the second region of the display is exposed to the outside and a cumulative time during which the second region is not exposed to the outside, based on the sensing information;
- calculate a difference in cumulative time of the second region by subtracting the cumulative time during which the second region is not exposed from the cumulative time during which the second region is exposed; and
- subtract the difference in time of the second region from the total cumulative time, thereby adjusting the image data to be displayed on the second region and the image data to be displayed on the first region.

10. The electronic device of claim 9, wherein the first display processor and the second display processor further comprise first and second gamma blocks electrically connected to a source driver of the display and providing voltage compensation for gamma adjustment, and are configured to control a source output voltage provided to the source driver to be the same by electrically connecting the first and second gamma blocks, and
wherein the first and second gamma blocks have a line formed therein to electrically connect a gamma tap voltage regulation circuit of the first display processor to a gamma tap voltage regulation circuit of the second display processor.

11. The electronic device of claim 10, wherein a line electrically connecting the first display processor and the second display processor is formed along a non-driving portion (BM; black matrix) of edges in the display or is formed along an upper line of a thin-film encapsulation (TFE) layer constituting the display.

12. The electronic device of claim 8, wherein the main processor is configured to;
- calculate a difference between the resolution corresponding to a size of the first region and the resolution corresponding to a size of the second region; and
- adjust output data to be displayed on the first region and output data to be displayed on the second region, based on a difference value of the load of data to be processed to output the image data.

13. A method of driving a display of an electronic device, the method comprising:
- detecting a request for displaying image data in a structure of a display including a first region, which is always exposed on a front surface of the electronic device, and a second region, which is accommodated inside the electronic device in a hidden position and is exposed to an outside of the electronic device in an exposed position;
- in response to a determination that the second region is in the hidden position and a view region on which image data is to be displayed is identified as the first region, driving the first region of the display at a first frame rate on the basis of a resolution corresponding to a size of the first region and the second region, and displaying image data in the first region;
- identifying, when the second region changes from in the hidden position to in the exposed position according to the change in the structure of the display, a size of the view region; and
- in response to a determination that the view region is changed to include the first region and at least a part of the second region driving the first region and the at least a part of the second region of the display at a second frame rate lower than the first frame rate on the basis of the resolution, and displaying image data in the first region and the at least a part of the second region.

14. The method of claim 13,
in response to a determination that the view region is changed to include the first region and an entirety of the second region,
driving the at least one display processor at a third frame rate lower than the second frame rate, and
wherein the first frame rate is a maximum frame rate according to a performance of the display and the third frame rate is a minimum frame rate according to the performance of the display.

15. The method of claim 14, further comprising:
- determining whether or not or not the second region accommodated inside the electronic device is exposed to the outside of the electronic device using sensing information;
- activating a second display processor among a first display processor and the second display processor in response to a condition in which the second region is exposed to the outside of the electronic device;
- dividing the image data to be displayed on the display into the first region and the second region according to the exposed area of the exposed second region;
- based on the divided image data, performing control to drive the first region using the first display processor and drive the second region using the second display processor;
- calculating a difference in a display area between the first region and the second region after dividing the image data to be displayed on the display into the first region and the second region, thereby adjusting the image data; and
- controlling, based on the divided image data, the first region to display the image data processed through the first display processor and the second region to display the image data processed through the second display processor.

* * * * *